United States Patent [19]

Punater et al.

[11] Patent Number: 5,043,749

[45] Date of Patent: Aug. 27, 1991

[54] PRINTING PRESS AND METHOD

[75] Inventors: Dinesh G. Punater, Dayton; Richard A. Gaspar, Centerville, both of Ohio; Vincent T. Kubert, Melbourne, Fla.; Mark F. Duchesne, Dayton, Ohio

[73] Assignee: AM International Inc., Chicago, Ill.

[21] Appl. No.: 458,940

[22] Filed: Dec. 29, 1989

[51] Int. Cl.[5] ...................... G01D 15/06; G03G 15/01

[52] U.S. Cl. ................................ 346/153.1; 346/157

[58] Field of Search ............................ 346/153.1-157

[56] References Cited

U.S. PATENT DOCUMENTS 4,569,584 2/1986 St. John et al. ................ 346/157 X
4,804,979 2/1989 Kamas et al. ...................... 346/157
4,827,315 5/1989 Wolfberg et al. .................. 346/160
4,912,490 3/1990 Negoro et al. ..................... 346/160
4,926,200 5/1990 Ohyama et al. .................... 346/160
4,949,104 8/1990 Negoro et al. .................. 346/153.1

*Primary Examiner*—George H. Miller, Jr.
*Attorney, Agent, or Firm*—Tarolli, Sundheim & Covell

[57] ABSTRACT

A press, and a process of printing a combination of fixed and variable data on such press, wherein printed images are created by direct digital driving of an imaging device at normal press speed, optionally followed by one or more processing operations in the case of business forms. The content or arrangement of the printed images can be changed without stopping the press. The press and process use one or more novel electrostatic printing engines having a direct digital imaging system which can create latent electrostatic images at normal press speeds, including the ability to accommodate substantial speed variations. Together with these printing engines, an electronic imaging system is provided in which fixed (or base) image data and variable image data are combined electronically to drive a single exposure system. Repetitive latent images are formed and developed using a liquid toner, and the resultant visible image is transferred and fixed to a variety of materials, in a continuous web. The photoreceptor surface on the drum, on which the images are formed and developed, is also cleaned and thoroughly dried each revolution. Make ready time between successive printing jobs can be significantly reduced. The press also has a novel fuser/dryer in which the developer carrier liquid is vaporized from the drum and treated through a catalytic converter to control emissions from the press. Heat from the catalytic treatment of the volatile carrier liquid is utilized as a heat source for air used in the fuser/dryer, thus providing a recuperative system.

64 Claims, 14 Drawing Sheets

10
12
14
22
23
28
38
40
42
45
100
120
122
124
PE 2
PE 1
MS1

REWIND
32D
34
33
ZIG-ZAG FOLDER
SHEETER
30
SENSOR
25
38
40
2
W
24
152
150
38

51
W
51
50

50
91
90
86
84
87
89
WEB
70
87A
85

CHANNELS
DATA 10
DATA 8
DATA 6
DATA 4
DATA 2
DATA 0
DATA 12
DATA 14
DATA 16
DATA 18
DATA 20
DATA 22
TBA
CLK 1
VC 1
VC2
CLK 2
TBB
CLK 3
VC3
VC 4
CLK 4
DRUM ROTATION
LED 1
PIN 1
A10
A11
A13
A14
B13
B10
MODULE 0
MODULE 1
MODULE 2
MODULE 3
MODULE 4
MODULE 5
MODULE 6
MODULE 7
MODULE 22
MODULE 23
00-03
04-07
4-7
03
4-07
DATA 1
DATA 3
DATA 5
DATA 7
DATA 9
DATA 11
DATA 23
DATA 21
DATA 19
DATA 17
DATA 15
DATA 13
CHANNELS

D0, D2, D4, D6, D8, D10
+5V
C6
0.1UF
26L5328
CLK
+DATA 10 2
-DATA 10 1
+DATA 8 3
-DATA 8 4
+DATA 6 18
-DATA 6 34
+DATA 4 19
-DATA 4 35
+DATA 2 37
-DATA 2 21
+DATA 0 20
-DATA 0 36
+CLK 123
-CLK 139
U1
U2
U7
74LS161
LD
T
P
A
B
C
D
OA
OB
OC
OD
CLR
RCD
U6
74LS161
CTR
D-7
+5 5,6,7,8
GND 10,11,12,13
C5
4.7UF 10V 20%
+VC1 40
C2
0.1UF
CTR
+TBA 0 43
-TBA 0 26
+TBA 1 44
-TBA 1 27
+TBA 2 25
-TBA 2 42
+TBA 3 41
-TBA 3 24
U3
26L532B
LAT
TA0-3
LAT
+LATCH/RESET 45
-LATCH/RESET 28
R13
120
U4
C4
0.1UF
26L532B

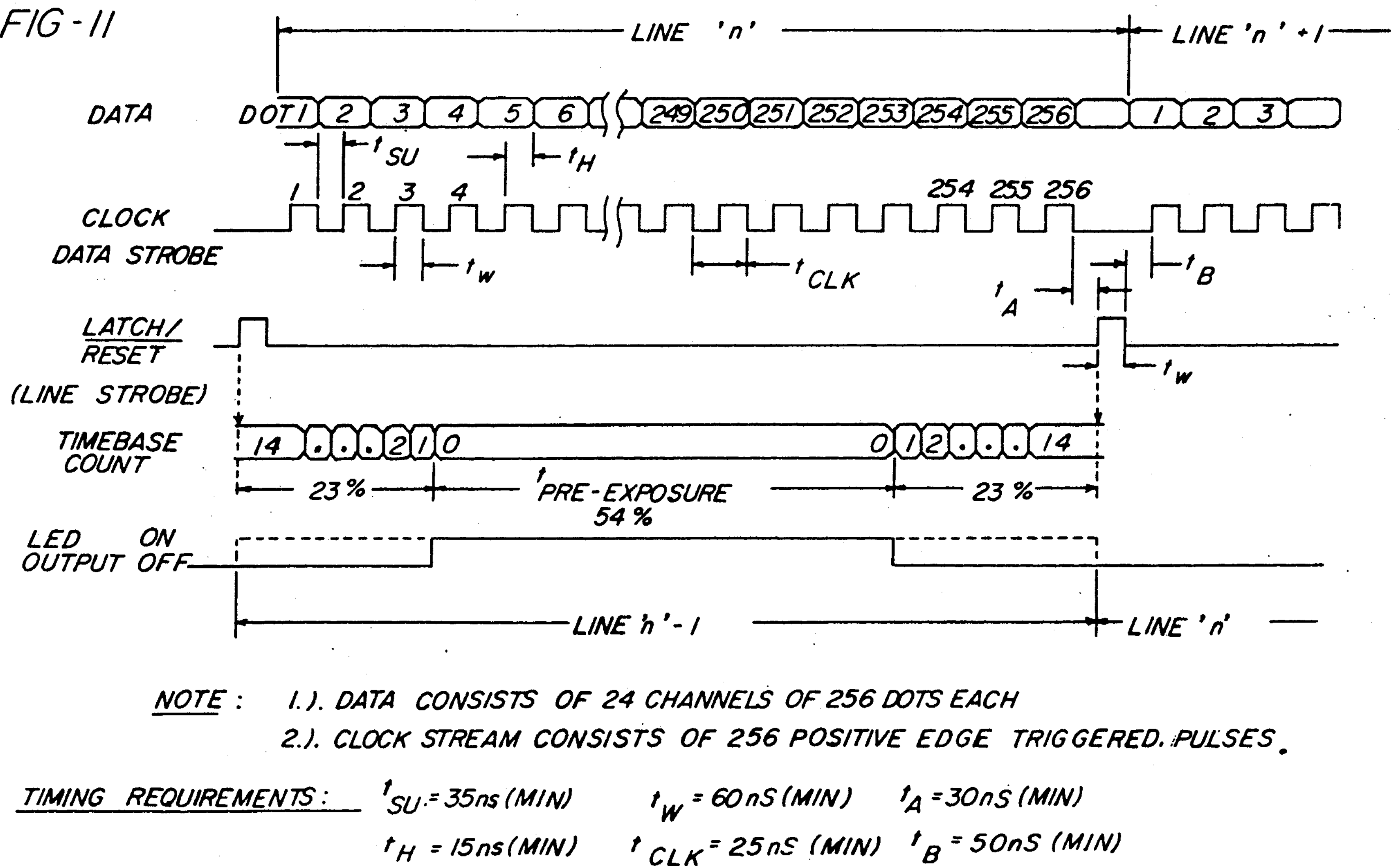
FIG-11
LINE 'n'
LINE 'n'+1
DATA
DOT 1
$t_{SU}$
$t_H$
CLOCK
DATA STROBE
$t_W$
$t_{CLK}$
$t_A$
$t_B$
LATCH/RESET
(LINE STROBE)
TIMEBASE COUNT
23 %
$t_{PRE-EXPOSURE}$ 54 %
23 %
LED OUTPUT
ON
OFF
LINE 'n'-1
LINE 'n'
NOTE:
1.). DATA CONSISTS OF 24 CHANNELS OF 256 DOTS EACH
2.). CLOCK STREAM CONSISTS OF 256 POSITIVE EDGE TRIGGERED PULSES.
TIMING REQUIREMENTS:
$t_{SU}$ = 35ns (MIN)
$t_W$ = 60nS (MIN)
$t_A$ = 30nS (MIN)
$t_H$ = 15ns (MIN)
$t_{CLK}$ = 25nS (MIN)
$t_B$ = 50nS (MIN)

PRINTING PRESS AND METHOD

BACKGROUND OF THE INVENTION

This invention relates to printing presses, particularly to web presses, and has special applicability to a special form of web press which is known as a forms press, used to manufacture printed business forms which combine unique printed material with various physical attributes. These include cross-perforations which delineate successive forms that are connected and zig-zag folded, line feeding perforations which are usually marginal, other perforations to define separable segments of the forms, and successive numbering of the individual forms. A typical forms press of this type is described in U.S. Pat. No. 4,177,730; current models of such a press include provisions for changing the size of the printing and processing cylinders of such a press.

Business forms are rapidly increasing in use, particularly single-part forms, and the demand is extending into so-called short run forms, where a customer may only order a relatively small quantity, for example 5,000 to 10,000 forms. The makeready of the press, particularly of the offset printing units or towers, occupies a greater percentage of the total run time in shorter runs. In order to control costs, keep prices reasonable, and still meet the demand for these relatively smaller orders of business forms, the forms manufacturing industry needs a forms press which requires a minimum of makeready, can operate at different speeds (which may vary considerably) up to a reasonably fast printing speed (e.g. 500 ft./min), preferably can make changes in the printed material of the form without time consuming shut-down and makeready, and which has the capability of providing a wide variety of forms.

Various attempts have been made to adapt laser printing systems to the printing of variable information on pre-printed webs. Those systems utilize powder developers, which are quite expensive when their particle size is reduced to increase resolution to that comparable to other types of printing such as lithography. Furthermore, such particle size reduction makes powder toners even more difficult to handle, and increases the already present serious problems of pollution control as part of handling such powder developers. Equipment maintenance is also a potential problem with powder toner systems, because the attendant "powder cloud" permeates the equipment and its ambience, and tends to deposit on surfaces such as corona wires, lenses, belts, etc. where such deposit adversely affect operation, beyond being a clean-up nuisance.

Relatively sophisticated copy machines have been developed, using powder toner, and while a few of these have capability of printing on web material those units are essentially a variation of similar sheet fed copiers. They all have operating speeds in the eighty-five to one hundred copy/minute range, and this speed is fixed. Their exposure and development systems will not tolerate variation in speed. Such prior art copiers, by their very nature, are also sensitive to characteristics of the copy material, e.g the sheet on which the copy is made. In general, those copiers have difficulty making good reproductions on certain coated papers, or on pressure sensitive paper with encapsulated dyes, or on sheets of variable thickness as where a blank label is already adhered to the sheet.

SUMMARY OF THE INVENTION

The present invention provides a novel electrostatic printing engine, a unique web press using one or more of these printing engines, and a forms press combining one or more such printing engines with a processing section to achieve manufacturing of successive runs of different business forms with significantly reduced makeready time between the runs. Under some circumstances the press of the invention can proceed from one run to another without stopping the press, and in fact without any reduction in speed of the press, provided the basic operations of the press remain constant.

While the principal novelty of this press resides in unique features of its printing engine (or engines), the combination of &these with the processing section results in a synergistic effect that has resulted in a vastly improved and more efficient press for business forms and other applications which require printing information from a data base which changes periodically, and/or printing of job runs where information changes from job to job, and/or printing of forms or copies wherein information changes from one form to the next, or one page to the next. This unique press also has capability to combine digital image information from two different sources (e.g. memories) into composite digital image data which is then used to drive a single imaging system.

Such a press, according to the invention, employs (a) digital electronic image creation, generation, and merging;

(b) electrophotographic printing, e.g. electrostatic printing of images using liquid toner for image development;

(c) the type and versatility of web handling associated with forms presses or the like;

d) web feeding under controlled tension, which in turn contributes to accurate length control, an important factor in continuous forms manufacturing or other repetitive printing wherein the various pages must be of uniform length for further handling;

e) ability to print on a substantial variety of materials, of different thickness or other characteristics; and f) ability to maintain quality electronically printed product at substantial speeds, in a range of at least 100 to 300 feet/minute (or even greater), and during speed changes within that range.

Because of these features, the press and the unique methods of printing have application in a large variety of businesses, to wit, business forms printing, direct mail (promotional) printing, printing of tags and/or labels, government or financial printing, documentation printing (where documents need periodical updating), and check printing.

In a comprehensive embodiment, the invention is a unique combination of digital electronic image creation and generation, combining fixed and variable digital image information, producing the resulting images by electrophotographic methods, developing those images using liquid toner, transferring and fixing those images onto web material using forms press web handling techniques. Thus, as necessary, the invention may include performing processing steps on the web material to produce the features of continuous business forms which adapt them to automatic feeding, bursting, combination into multi-part forms and later separation during use of the forms. The inclusion of successive numbering, by arabic numerals and/or bar code, is preferably accomplished as a part of the variable information recorded and developed as mentioned above. If desired, the press can be assembled to include other types of printing units, such as one or more lithographic printing towers, flexographic printing units, etc. so as to achieve a wide variety of printing capabilities.

The printing engine uses a unique form of high speed electrophotographic printing which is capable of continuous printing, preferably on web material, at speeds and sizes, and with resolution and accuracy, essentially equal to offset printing. Images are created in the printing engine by a digital dot-image exposure system which is electronically driven from imaging data which can be refreshed, a page at a time, to produce successive identical copies of desired forms, and which can also be modified without slowing of the printing engine so as to print variable data (e.g. forms numbering or bar coding) or to switch "on the run" to an entirely new form as part of the next job. The direct digital input of the printing engine also allows immediate running of the different related parts of a multi-part form, merging of form information, rapid customizing of standard forms, creation of new forms using high speed electronic digitizing and editing equipment, and the establishment of a digitized library of customer's forms which can be quickly recalled and re-run upon short demand.

The unique printing engine utilizes a drum having a surface photoreceptor, e.g. a photoconductive surface as the active surface on which developed electrostatic images are created, and an offsetting arrangement by which these images are transferred to the forms material, most commonly a paper web. The drum is rotatably driven at a peripheral velocity equal to web speed through the press. Special high intensity charging, exposing-discharging, developing and cleaning systems assure the drum surface is discharged, cleared of residual toner, and has a uniform electrostatic charge applied to its photoconductive surface each revolution. That charge is in the order of at least 1000 Volts DC.

A digital imaging device, preferably in the form of a relatively high intensity LED array mounted to extend transversely of the rotating drum surface, operates to discharge the background or non-image areas of the passing drum surface to within a range of substantially lower potential, e.g. 100 to 300 Volts DC, by exposing individual dot areas to focused radiation at a predetermined frequency and intensity, and in area size in the order of 0.0033 inch diameter, whereby the remaining or image areas(s) comprise a latent electrostatic image of the printed portions of the form. The size of these dots or pixels provides an acceptably high resolution image for forms printing, and in fact the resolution is comparable to good quality lithographic offset printing. Solid coverage of desired areas is attainable.

The four basic components of the imaging system are a Scheduler Control Unit (SCU), a Raster Image Processor (RIP) which includes character generator capability, a Data Interface Unit (DIU), and the novel LED array. The controlling intelligence behind the imaging system is accomplished through the SCU. The SCU synchronizes all print data to the web, prepares all imaging resources that are required, channels text data from a host computer, and controls all data transfer through the system. The raster image processor (RIP) is basically a form of a commercially available character generator. It accepts information, such as ASCII character codes, and outputs bit-mapped information for generating such characters in a dot pattern, based on the font(s) selected.

The DIU contains all the storage and location circuitry required for storing text and baseforms in rasterized bit-map format. Pairs of DIU memory sections cooperate with each other to provide bit-mapped fixed (e.g. base form) and bit-mapped variable image data. In use, one pair of memory sections is scanned to output data to registers at the LED array, while the other pair is loaded with data. Thus enough memory is available in each DIU for both base form and variable information for two images. The SCU controls the input and output of data to and from the DIUs, and transfers pixel initiating data to the LED array, line-by-line.

The LED array is divided into twenty four modules of 256 LEDs each, together with latching shift register circuits, comparator circuits, and driver circuits for each LED, as is generally known in the prior art. A set of EPROMs receives data clocked into them from the DIU. This data may be termed "pixel initiating" or writing data, since it determines whether a pixel is or is not printed at a given location, e.g. this data determines whether or not any specific LED is to be driven in exposing a line of pixel areas by driving the array.

A bank of EPROMS provide a memory storing compensation information (in a typical embodiment four-bit codes) which determines modification of LED on-time to compensate for non-uniform light emissions from different ones of the LEDs. Data is clocked simultaneously into the EPROMS from the DIU via data lines which extend to the respective EPROMS. Thus pixel writing data is transferred in parallel to the EPROMS. A system clock controls loading data from a DIU into the memory which passes on compensated pixel driving data distributed serially into individual latch/registers. Thus, data is loaded simultaneously through the EPROMs and to the latch register set for each module, but sequentially into the latch/registers, and the loading time is that for only one module.

A driver circuit for each LED applies power to the LED for generating a small light beam onto the drum surface at a given pixel location. Each driver circuit is in turn controlled by a comparator circuit which distributes the compensated driving data from the latch/registers to the correct LED driver circuit.

Each EPROM uses an on-off writing signal from the DIU as an address line into the EPROM. An "off" signal will result in a four-bit zero code, while an "on" signal will result in a four-bit compensation value to the register/latch circuit in the appropriate module.

The writing data from the DIU memory is clocked into the EPROM circuits and thence to the latch/registers under control of the SCU at a rate which is greater than the fastest usage of the data to refresh the state of the LED drivers for each line. Utilization of the LED driving data will, however, be at a variable rate depending upon web and drum speed. Thus, data is fed to the LED array from the DIU at a high rate, compensation data is added, and the resultant driving data is fed to the latch/registers at the module inputs at this high rate. This driving data is distributed to the individual driver circuits, at a lower rate which varies dependent upon web and drum speed. The driver circuits are also compensated to increase the driving current of all of them as higher printing speeds are called for.

An encoder pulse generator is driven with the photoreceptor drum and provides outputs equal to one-eighth of a pixel height, i.e. eight pulses per pixel. That output divided by eight is the source of a latch pulse train, each latch pulse coinciding with the top border of a line of square pixel areas across the photoreceptor surface. Due to the variable speed capability of the apparatus, the duration between successive latch pulses will vary considerably, in a range of at least three to one, as web/-drum speed is changed.

The SCU receives the divided PG outputs, divides the time between leading edges of successive latch pulses by sixty-four, and generates a time base count which equals 1/64th of the latch/reset interval. This represents the maximum time, at a chosen drum and web speed, during which an LED can be driven. This timebase information is sent to the time base drivers and also to the latch-reset drivers which cause the module shift registers to output data to each comparator. This time between latch pulses in effect represents a time interval or window during which the LEDs may be driven, depending upon the state of the pixel initiating data bits (on or off). The comparative data stored in the EPROMs is also latched into the comparator circuits as part of the LED driving instructions, and this determines at which one of the timebase counts the drivers will be effective to apply power to their corresponding LEDs.

The latent image then is carried, as the drum rotates, past a developing station wherein it is subjected to the action of a special high speed liquid toner developer, thus forming a developed or visible image with merged liquid toner particles, which image is thence transferred and fixed to the paper web or other material. The developer is a special proprietary combination of small particle size toner dispersed in a carrier liquid. The liquid developer supply system constantly recirculates developer through a specially constructed shoe, which is closely fitted to the moving drum surface, for example at a spacing of about 500 microns (0.020 inch).

The developer is monitored and refreshed as needed to maintain a predetermined concentration of toner particles in volatile carrier liquid, at a negative charge of 60 to 75 picamhos/cm. The developer shoe is electrically isolated from the drum, and functions as an electrode which is maintained at a potential in the order of +500 to 600 V DC. Thus the negatively charged toner particles are introduced into the shoe and dispersed among electrical fields between the image areas and the developer electrode, on the one hand, and between the background or non-image areas and the developer electrode on the other hand. Typically, the electrical fields are the result of difference in potential a) between the image areas (+1000 to 1450 V) and the developer electrode (+200 to 600 V), which cause the toner particles to deposit on the images areas, and b) between the background areas (+100 to 300 V) and the developer electrode (+200 to 600 V), which causes toner particles to migrate to the developer shoe in those areas. Expressed another way, the electrical fields in the image and non-image areas are reversed, and are in the order of at least 2 V/micron. The result is a high quality distinction between image and background, and good coverage of solid image areas. The tendency of toner particles to build up on the developer shoe or electrode is overcome by the circulation of liquid toner through the shoe at rates in the order of 7.57 to 37.85 liters/min. (2 to 10 gal./min.) back to the toner refreshing system.

As the drum surface passes from the developer shoe, a reverse rotating metering roll, spaced parallel to the drum surface by about 50 to 75 microns (0.002 to 0.003 inches), acts to shear away any loosely attracted toner in the image areas, and also to reduce the amount of volatile carrier liquid carried by the web with the toner deposited thereon, and to scavenge away any loose toner particles which might have migrated into the background areas. This metering roll has applied to it a bias potential in the order of +200 to 600 V DC, varied according to web velocity.

The web path then leads to an image transfer station where idler rollers guide the web material into contact with a band-like area across the drum surface. Behind the web path at this location is a transfer corotron to which is applied a voltage of +6600 to 8000 V DC. The web is driven at a speed equal to the velocity of the drum surface to minimize smudging or disturbance of the developed image on the drum surface, and to assure that the printed image is of the proper length. Both toner particles and liquid carrier transfer to the web, including carrier liquid on the drum surface in the background areas.

A second printing engine, identical to the first, is arranged to receive the web material from the first printing engine, and produce another image using other toner, as of a different color if more than one color is desired in a single printing operation, or if a perfecting (printed both sides) operation is desired, in which case the web can be turned by conventional turn bar mechanisms before passing the second such printing engine. Due to the digital electronic driving of the printing engines, registration of the successively printed images can be adjusted, if need be, on an almost instantaneous basis. Also, the developed image transferred to the web from the first printing engine will be maintained during the second transfer, thus only after both images have been superimposed on the web material is the composite image fused to the web.

It should be noted that, due to the continuous nature of the photoreceptor surfaces, and the "line at a time" exposure by the LED arrays, the length of the actual image produced on the web is practically unlimited, and the press can produce a scrolling type of output if desired. From the printing engines, the web material is transported to a fuser and dryer apparatus, wherein the carrier liquid is removed from the web material and the toner particles are fused thereto. In operation, the carrier liquid is mixed with air and passed through a catalytic converter, where it is oxidized, leaving essentially water vapor and $CO_2$ to be discharged. The heat from the oxidation process is recovered and transferred to incoming air to the fuser dryer, thus the fuser/dryer apparatus is recuperative, and the energy for drying the web and fusing the toner particles is essentially derived from the volatile carrier liquid.

The web path proceeds to a chill roll, where the web passes about a substantial part of the circumference of a water cooled roll. This reduces the temperature of the web approximately to ambient temperature. Then the web path extends through a processing section, the rotating elements of which are driven synchronously with the printing engine(s). This section provides, as required for a given job, cross-perforations, feed holes (which are usually located regularly spaced in margins of a text image), longitudinal perforation, file holes or other special notching for each form, numbering and/or imprinting (if this is not done in the printing engine), and partial perforations as might be needed to define a separable section of a form. In an actual embodiment of the invention, the printing engines and the rotatably driven units of the processing section are driven from a common motor drive via a line shaft and appropriate gear drives.

Depending upon the number and complexity of these various processing functions, the speed of the press may have to be adjusted. In general, the more complex are the processing operations, the more the overall press speed must be reduced to avoid undue waste due to inaccurate imposition of all the processing functions, jamming or processing errors. In practice this speed adjustment is left to the judgment of the press operator and his supervisor, and these persons consider a relatively wide range of speed variation to be a necessary capability of a forms press. Thus any printing engine using electrostatic imaging and development must be able to accommodate such speed changes without complex adjustments of exposure and development duration and timing, while maintaining quality of the printed images. To simplify this task, the main drive motor is provided with a controller which includes an electronic processor programmed to operate the press through start-up and shut-down phases, and to control speed of the drive motor (and thus press speed) while providing control signals associated with various selected speeds to the different sections of the press.

Upon exiting the processing section, the web can be handled in different ways, as may be desired. For example the web may be rewound on a mandrel if it is to become one of several parts of a multi-part form, zigzag folded for use in continuous printers or other equipment for using the forms, or separated into individual form sheets. It is also possible to plow fold and cross fold the web material to form multi-page signatures, as for printing magazines or books.

Accordingly, the primary object of this invention is to provide a press, and a process of printing a combination of fixed and variable data on such press, wherein printed images being manufactured are created by direct digital driving of an imaging device at normal press speed, optionally followed directly by one or more processing operations in the case of business forms or the like, as required for a particular job; to provide a printing press and process in which the content or arrangement of the printed images can be changed without stopping the press; to provide a press and process with an electrostatic printing engine having a direct digital imaging system which can create latent electrostatic images at normal press speeds, including the ability to accommodate substantial speed variations; to provide an electronic imaging system in which fixed (or base) image data and variable image data are combined electronically to drive a single exposure system; to provide a press and process wherein the latent image is developed using a high resolution liquid toner, and the resultant visible image is transferred and fixed to the material of the forms, such as a continuous paper web; to provide such a press and process in which makeready time between successive forms printing jobs can be significantly reduced, as by at least one order of magnitude; to provide such a press in which the drum, on which the electrostatic image is formed and developed, is also cleaned and thoroughly dried each revolution so as not to interfere with the next charging of the drum; to provide a novel system including a fuser/dryer apparatus in which the carrier liquid is vaporized from the drum and treated through a catalytic converter to control emissions from the press; to provide such a fuser/dryer arrangement wherein heat from the catalytic treatment of the volatile carrier liquid is utilized as a heat source for raising the temperature of air used in the fuser/dryer, thus providing a recuperative system.

Other objects and advantages of the invention will be apparent from the following description, the accompanying drawings and the appended claims.

BRIEF DESCRIPTION OF THE DRAWINGS

FIG. 11 is a timing chart.

DESCRIPTION OF THE PREFERRED EMBODIMENT

PRESS CONSTRUCTION

Figures 1A, 1D:
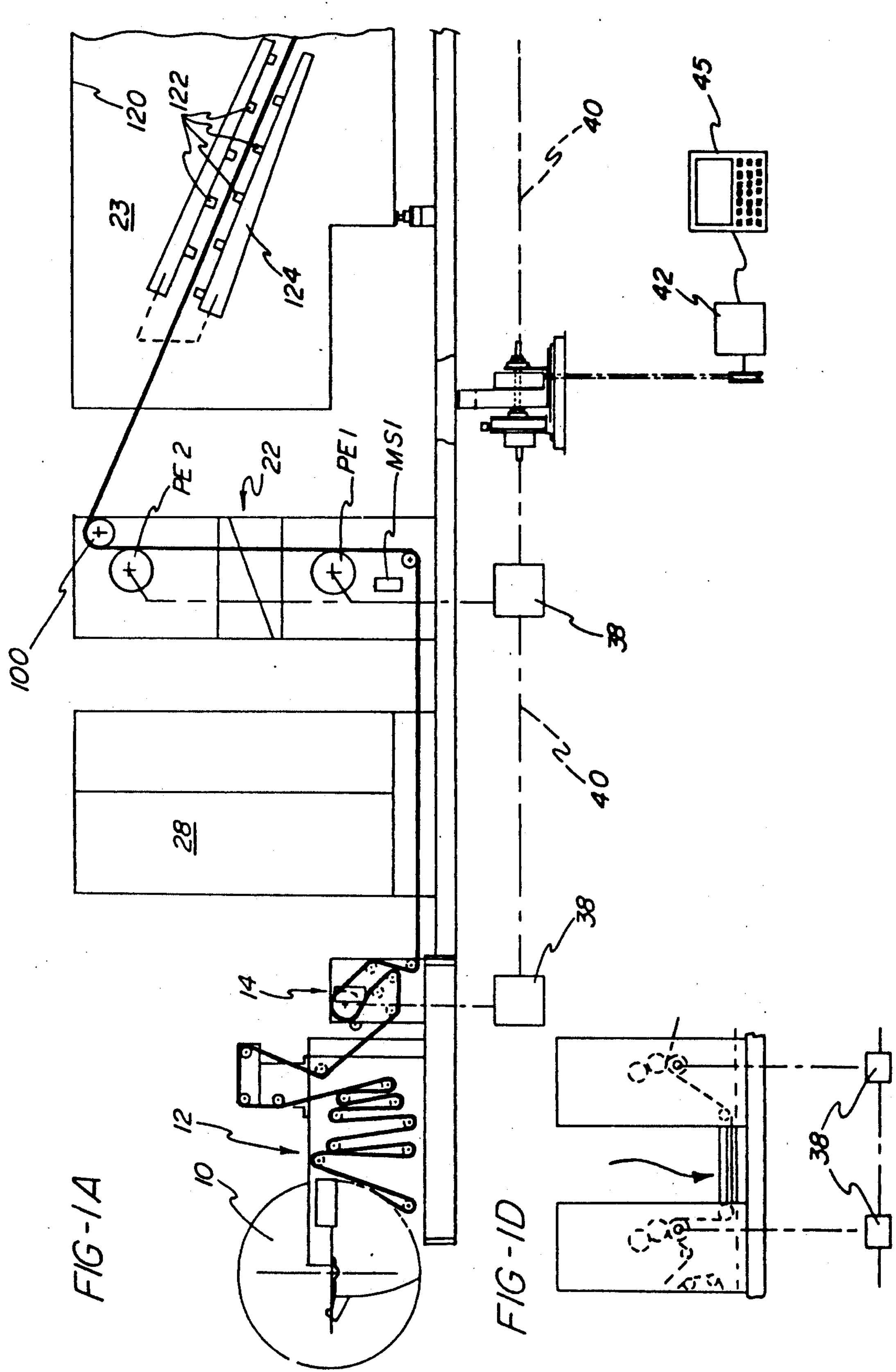
FIGS. 1A and 1B together are a schematic side elevation showing the overall layout of the components of the novel forms press provided by the invention.
FIG. 1D shows optional additional components, of standard construction, which may be added to the press shown in FIGS. 1A and 1B.
Figure 1B:
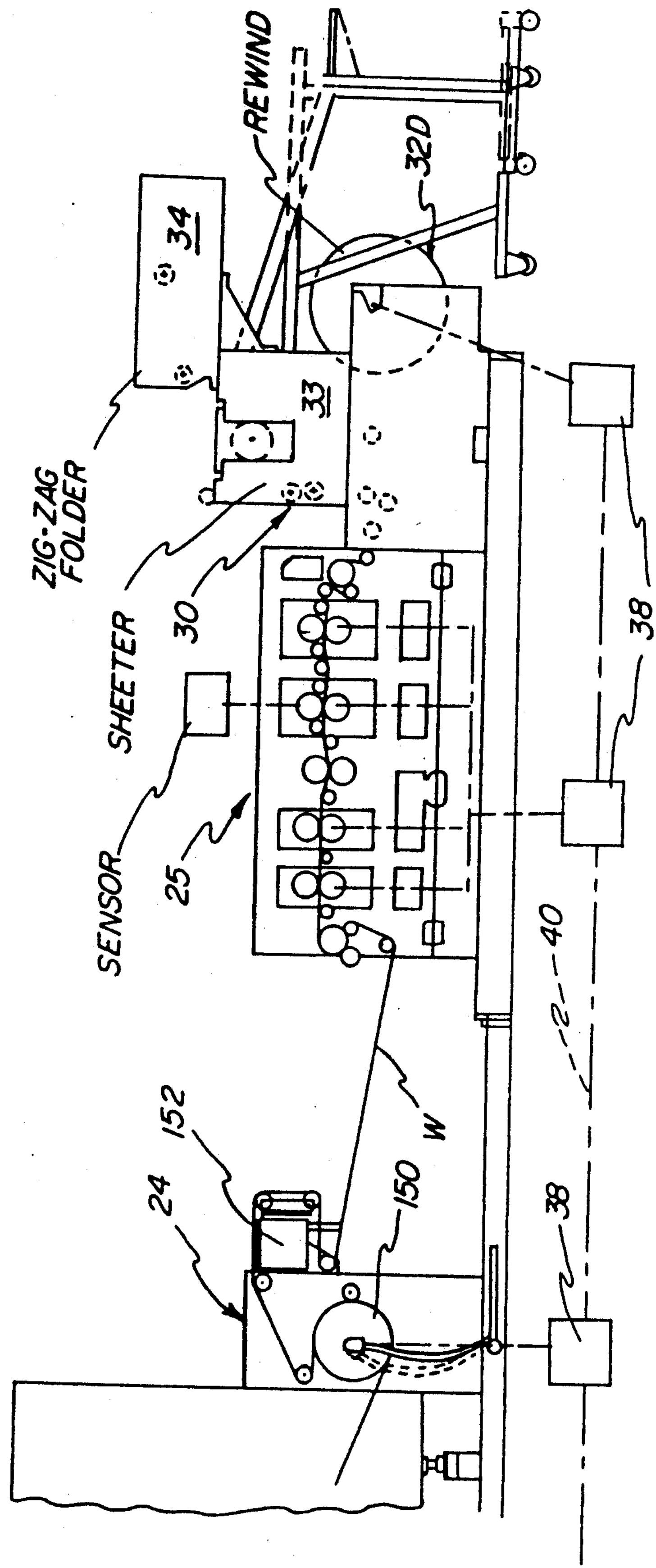
Figure 1C:
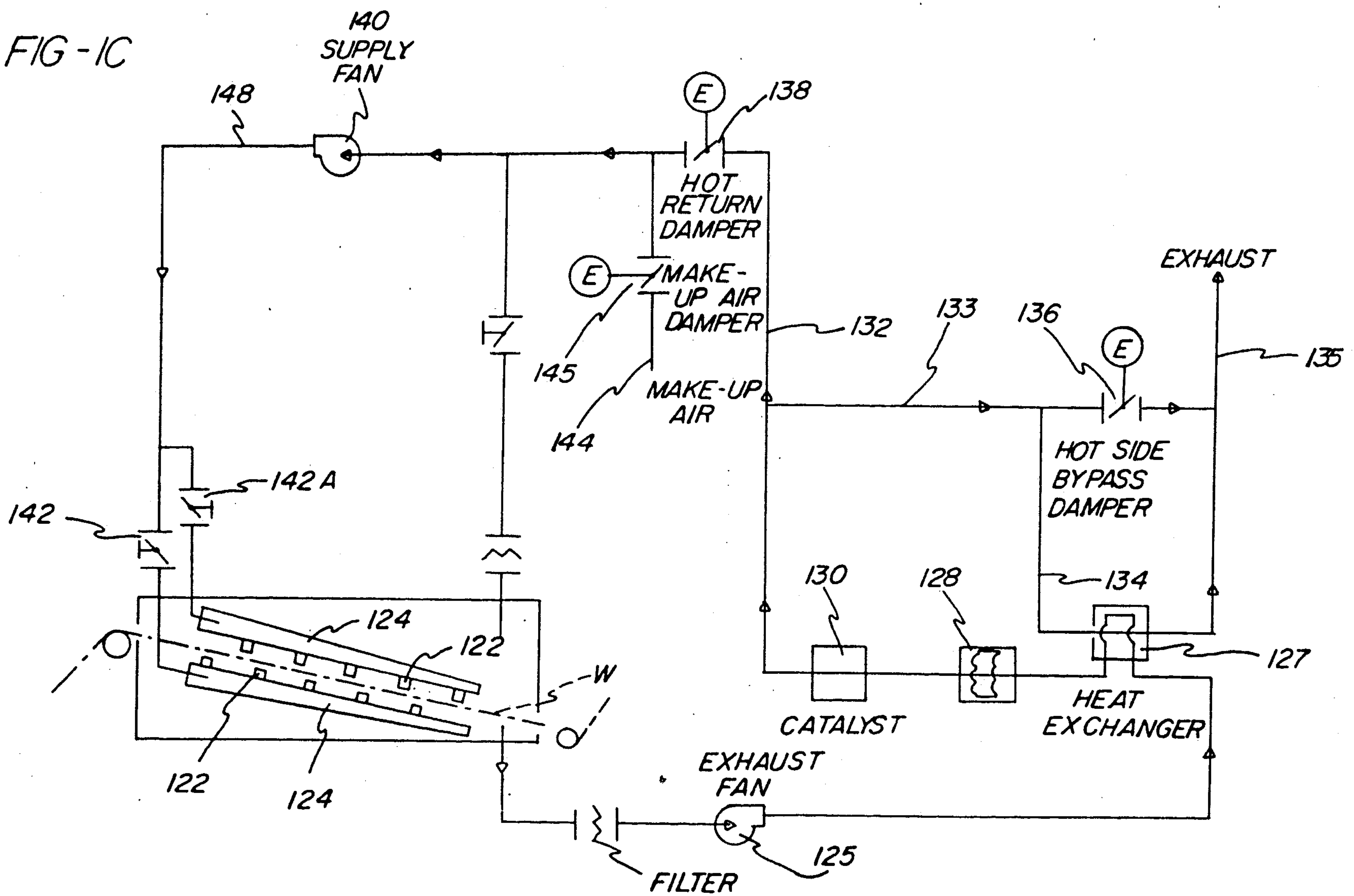
FIG. 1C is a schematic diagram of the fuser-dryer gas circuits.

FIGS. 1A and 1B show the over-all organization of a typical press constructed according to the invention. Web material W (e.g. paper) is supplied from a roll 10 thereof mounted in the unwind section 12, which also incorporates conventional infeed control apparatus 14 for supplying the web along a path 15, under predetermined and controlled tension. A form of infeed control is disclosed in U.S. Pat. No. 3,592,133. If desired the web may be passed first through a pair of optional offset towers 17 and 18 (see FIG. 1C) through which images may be conventionally printed on the web by offset lithographic methods.

From the offset towers the web path 15 leads through two electrostatic printing engines PE1 and PE2. Between these printing engines there are optional turning bars 22 of conventional design, through which the web may be threaded if it is desired to have the engine PE1 print on one side of the web, and the engine PE2 print on the opposite side, as in the style of a perfecting press. Then the web path extends through a fusing and drying apparatus 23, a chill unit 24, and into the processing section 25 of the press. The cabinet 28 provides housing for the electronics packages. It is here that various mechanical operations are performed on the web, including (possibly) line hole and file hole punching, and perforating, longitudinally of the web and/or across the web, or partial perforating. The finished web then proceeds to the delivery section 30 where the web may be threaded through appropriate idler rollers and onto a roll in a rewind section 32 (see FIG. 1A), or separated into sheets by threading the web to a sheeter mechanism 33, or folded in continuous zig-zag fashion by a conventional folder mechanism 34.

The press has a common drive for the various sections, as is well known and shown for example in U.S. Pat. No. 4,177,730, thus there are gear boxes 38 transferring rotary power from a line shaft 40, which is in turn driven by a main drive motor 42. These parts are illustrated in block form because they are per se well known. The motor controller 45 includes an electronic processor which can be programmed to operate the press through start-up and shut-down phases, and to control speed of motor 42 (and thus press speed) while providing control signals associated with various selected speeds to the different sections of the press. A typical drive and controller is the General Electric D.C. 300 digitally controlled and programmable adjustable speed DC drive.

Electrostatic Printing Engine

Figure 2:
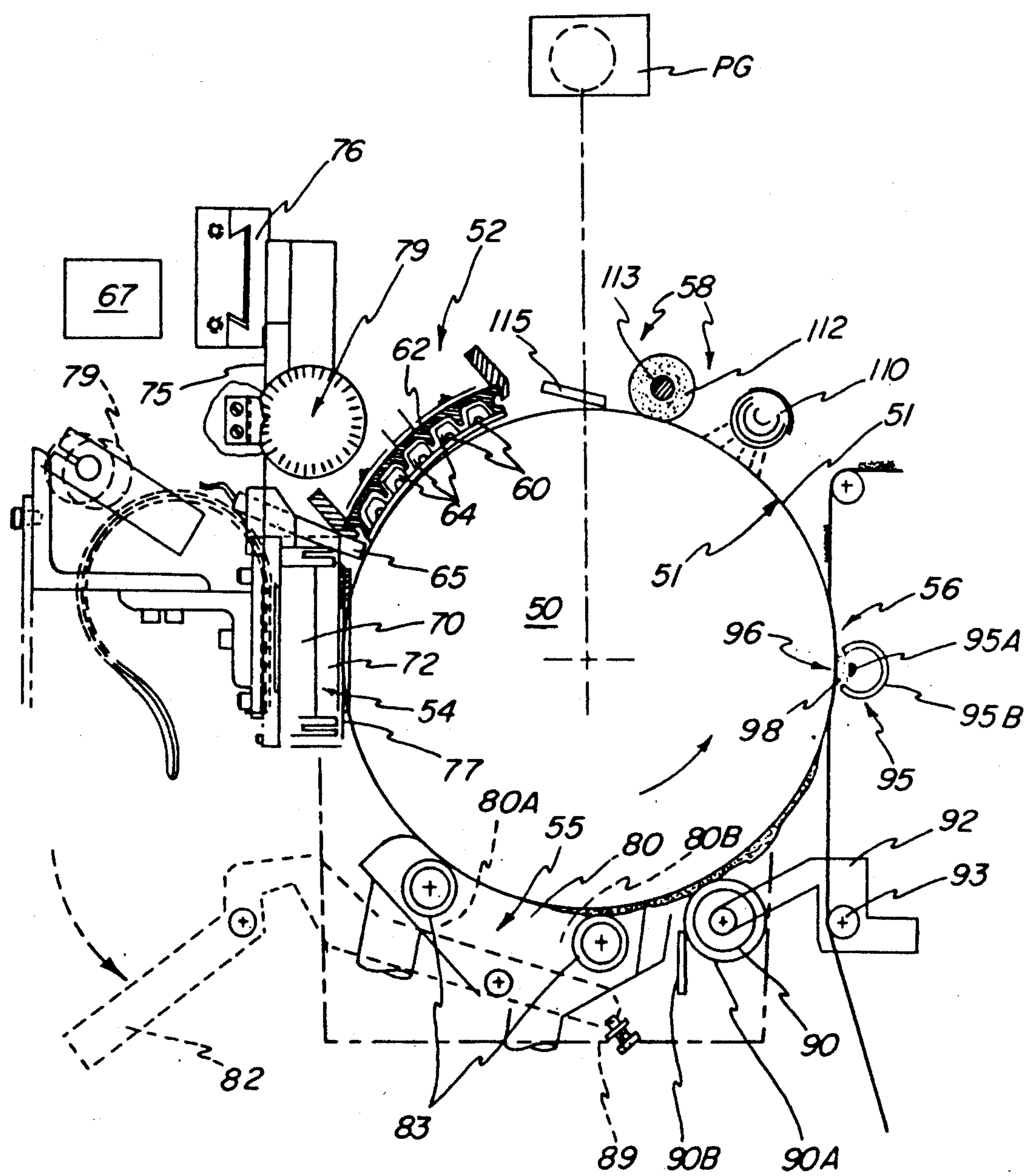
FIG. 2 is an enlarged schematic side elevation view illustrating the components of the printing engine of the press and their cooperative relationship.

Referring particularly to FIG. 2, the unique printing engine (PE1 or PE2) utilizes a rotatable drum 50 driven by line shaft 40 through one of the section gear boxes, and having an active photoreceptor surface 51 on which developed electrostatic images are created, and an offsetting arrangement by which these images are transferred to the web material. At the edges of drum surface 51 are annular bearer bands or rims 51A, which may be conveniently formed as anodized circumferential bands about the edges of an aluminum drum body. The drum is rotatably driven at a peripheral velocity equal to web speed through the press, and drum surface 51 is a light sensitive photoconductor (for example $As_2$-$So_2$) which behaves as an insulator in dark, and a conductor when exposed to light. As is typical of such photoconductors, certain wavelengths of optical radiation will produce the best results for this purpose.

Special systems are arranged sequentially around drum 50, as shown in FIG. 2, to accomplish the desired formation and transfer of images onto web W. These systems include a high intensity charging apparatus 52, exposing-discharging (or imaging) apparatus 54, developing apparatus 55, transfer apparatus 56 and cleaning apparatus 58. These assure the drum surface is discharged, cleared of residual developer materials, and has a uniform electrostatic charge applied to its photoconductive surface each revolution, while the developed images are continually transferred to web material W. Details of these systems are disclosed in copending patent applications, but the systems are described here in sufficient detail to show their overall cooperation in the press configuration where dimension are stated they are exemplary based on a successful embodiment.

That uniform charge is in the order of at least +1000 Volts DC, preferably between +1000 and +1450 V. To assure thorough and uniform charging of the photoconductive drum surface at least five corotron charging wires 60, impressed with a potential in the order of +5600 to +6800 V, are mounted in appropriately shaped shield member 62 which is divided into separate focusing chambers 64, one for each corona discharge wire 50. This assembly extends across the drum surface 51 and along an arc closely parallel to surface 51. Using a drum having a thirty-three inch circumference (thus 10.504 inch diameter) the arcuate length of the charging unit is about 4.5 inches or somewhat greater than one eighth of the drum circumference.

Counterclockwise around the drum (as viewed in FIG. 2) there is a charge potential sensor 65 which senses the voltage at the surface 51 and provides a continuous feedback signal to the charging power supply 67, thereby adjusting the charge level of the photoconductor surface 51 regardless of variations due, for example, to irregularities in the power supply or changes in the peripheral velocity of drum 50.

The digital imaging device 54, in the form of a relatively high intensity LED double row array 70, is mounted to extend transversely of the rotating drum surface 51. Each LED is individually driven from a corresponding driver amplifier circuit (see FIG. 3; later described) and emits light in the range of 655 to 685 nm., through a self focusing lens (not shown) onto the drum surface 51 in a dot or pixel size of 0.0033 inch diameter. In one successful embodiment there are a total of 6144 LEDs in the array, divided between two rows which are spaced apart in a direction along the circumference of the surface by 0.010 inch, and all fixed to a liquid cooled base block 74, with the lens assembly attached to the front of the array. The space between adjacent LEDs in the same row is 0.0033 inch horizontally, or transverse to the drum surface, and the LED arrays in the two rows are offset horizontally by the same dimension, thus by delaying the driving of the second row, the LEDS can cooperate to discharge selected one of a continuous series of adjacent dot areas or pixels across drum surface 51 at a resolution of 300 dots/inch.

Light from the LEDs operates to discharge the background or non-image areas of the passing drum surface to a substantially lower potential, for example in the order of +100 to +300 V. DC, by exposing individual dot or pixel areas to radiation at a predetermined frequency, as mentioned, whereby the remaining or image areas(s) comprise a latent electrostatic image of the printed portions of the form. The size of these dots provides an acceptably high resolution (300 dots per inch) image, comparable to good quality lithographic offset printing. This discharging of small drum surface areas, on a digital basis, is accomplished within small tolerances over a range of web speeds from 100 to 300 feet/minute.

The imaging device 54 is supported by attachment at its opposite ends to a plate-like spring 75 which is in turn fixed to the movable part of a dovetail slide 76 above and parallel to drum surface 51. At the sides of array 70 are electrically insulating follower strips 77 which are urged to ride against the bearer bands 51A. This arrangement maintains proper spacing of the imaging device to the photoconductive surface 51 and accommodates any out-of-round condition of the drum, its surface, or its rotating support. A micrometer type adjuster 78 acts on slide 76 to adjust side register of the array 70 to the drum 50. Also, a cam 79 can act against a bracket extension of the array to move the array 70 away from drum surface 51 against the force of spring 75.

The latent electrostatic image then is carried, as the drum rotates, past developing station 55 where it is subjected to the action of a special high speed liquid toner developer, thus forming a developed or visible image with merged toner particles, which image is thence transferred and fixed to the paper web or other material. The developer is a special proprietary combination of small particle size toner, having nominal sizes of 1 to 10 microns (0.00004 to 0.0004 inch) in width, dispersed in a suitable volatile carrier liquid such as Isopar, and combined with a charge agent which maintains a negative charge on the toner particles in the range of 60 to 75 picamhos/cm. The developing station 55 comprises a shoe member 80 (which also functions as a developer electrode) which is electrically isolated from drum 50, and extends across drum surface 51.

The face of shoe member 80 is curved to conform to a section of drum surface 51, and has a length, along the arcuate face, of about seven inches (about one quarter of the drum circumference), and is closely fitted to the moving drum surface, for example at a spacing of about 500 microns (0.020 inch). The shoe is pivotally connected at its opposite side to control levers 82 which are urged to move shoe 80 toward drum surface 51. Electrically insulating rollers or wheels 83 on the side of the shoe ride against the drum end surfaces 51A to maintain the desired close spacing of the shoe to the drum.

Figures 2A, 3:
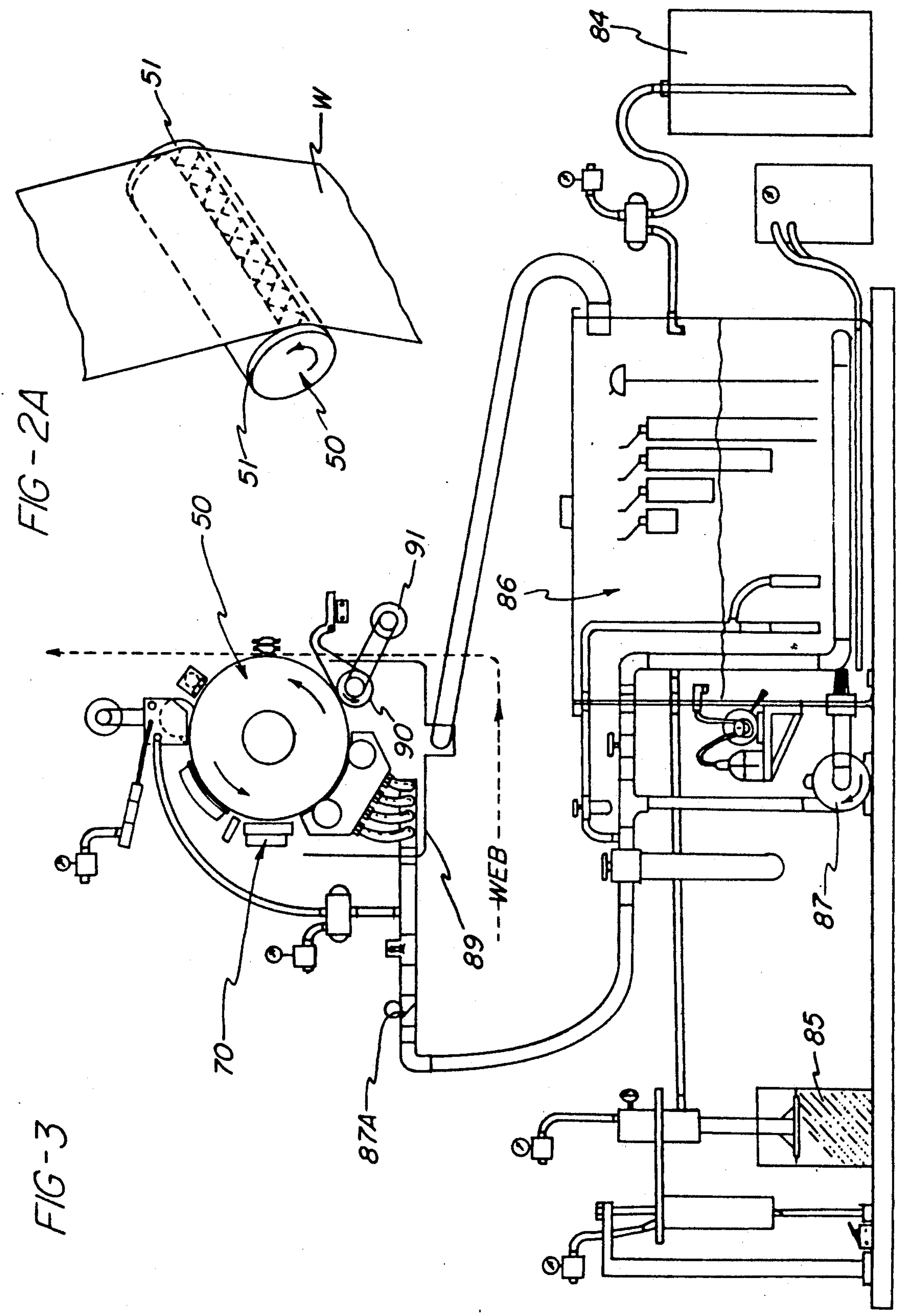
FIG. 2A is a schematic view showing the contact band of the web to the printing engine cylinder.
FIG. 3 is a systems diagram illustrating the relationship of one printing engine to the liquid developer supply system and various electronic signals supplied to the printing engine.

Referring to FIG. 3, the developer is monitored and refreshed as needed to maintain a predetermined concentration of toner particles in volatile carrier liquid at the desired negative charge. A supply of carrier liquid is contained in tank 84, and a supply of toner concentrate (with a high percentage of toner particles) is contained in tank 85. A main supply and recirculation tank 86 is connected via pump 87 to shoe 80 and a return line 88 leads back from a catch pan 89 (under shoe 80) to tank 86. When the toner concentration of the developer in tank 86 falls below a predetermined minimum, concentrate is added from tank 85 and mixed into the recirculated liquid developer. If the concentration becomes too high, carrier liquid is added from tank 84. Conductivity is measured in tank 86, and a suitable charge director is added to maintain conductivity, since conductivity is decreased during operation by using up the charge director in the application of developer to the latent image.

Developer shoe 80 functions as an electrode which is maintained at a potential in the order of +200 to 600 V DC. Thus the negatively charged toner particles are introduced into the shoe cavities and dispersed among electrical fields between the image areas and the developer electrode, on the one hand, and between the background or non-image areas and the developer electrode on the other hand. Typically, the electrical fields are the result of difference in potential a) between the image areas (+1000 to 1450 V) and the developer electrode (+200 to 600 V), which cause the toner particles to deposit on the images areas, and b) between the background areas (+100 to 300 V) and the developer electrode (+200 to 600 V), which causes toner particles to migrate to the developer shoe in those areas.

Expressed another way, the electrical fields in the image and non-image areas are reversed, and the field in image areas is in the order of at least 2 V/micron, while the field in non-image areas is in the order of 0.2 V/micron. The result is a high quality distinction between image and background, and good coverage of solid image areas. The tendency of toner particles to build up on the developer shoe or electrode is overcome by the circulation of liquid toner through the shoe at rates in the order of 7.57 to 37.85 liters/min. (2 to 10 gal./min.) back to the toner refreshing system, as shown in FIG. 3.

As the drum surface passes from the developer shoe (see FIG. 2), a reverse rotating metering roll 90, driven by a motor 91 (FIG. 3), and spaced parallel to the drum surface (by about 50 to 75 microns) by insulating end wheels, acts to shear away any loosely attracted toner in the image areas, and also to reduce the amount of carrier liquid carried onward by drum surface 51 with the toner deposited thereon, and to scavenge away any loose toner particles which might have migrated into the background areas. This metering roll has applied to it a bias potential in the order of +200 to 600 V DC, varied according to web and drum surface velocity. Roll 90 is also mounted on control arms 92 which are biased to move the roll toward drum surface 51 as indicated. The roll is located over pan 89 so developer taken from the roll by its scraper 90B will fall into the return system.

FIG. 2 shows transfer apparatus 56 as including a pair of idler rollers 93 which guide web W onto the "3 o'clock" location of drum 50, and behind the web at this location is a transfer corotron 95. The web is driven at a speed equal to the velocity of drum surface 51, to minimize smudging or disturbance of the developed image on the surface 51, and to maintain the correct image length on the web. The positioning of rollers 93 is such that the width (top-bottom) of the transverse band 96 of web-drum surface contact is about 0.5 inch, centered on a radius of the drum which intersects the corotron wire 95A, as shown by the dot-dash centerline in FIG. 2.

The shape of the transfer corotron shield 95B, and the location of the axis of the tungsten wire 95A in shield 95B, is such as to focus the ion "spray" 98 from the corotron onto the web-drum contact band on the reverse side of web W. The transfer corotron 95 has applied to it a voltage in the range of +6600 to +8000 V DC, and the distance between the corotron wire 93 and the surface of web W is in the order of 0.100 to 0.200 inch. This results in a transfer efficiency of at least 95%; e.g. at least 95% of the toner particles are transferred to web W. Both toner particles and carrier liquid transfer to the web, including carrier liquid on the drum surface 51 in the background areas. The web path continues into a fuser and dryer apparatus (FIG. 1A), wherein the carrier liquid is removed from the web material and the toner particles are fused thereto. The web is guided in this entry to the fuser-dryer over a roller 100 having a surface of expanded metal, which thus has contact with the web (and any developed image on the reverse or back side of the web) only in a plurality of small point-like regions, and the image is not disturbed.

The cleaning apparatus 58 is used to remove all toner particles and all carrier liquid from drum surface 51. Erase lamp 110 is arranged to flood surface 51 with light at sufficient intensity from either a blue light or white light fluorescent tube. Satisfactory results have been achieved with blue fluorescent tubes emitting predominantly at about 440 nanometers and with white fluorescent tubes emitting predominantly at 400, 440, 550 and 575 nanometers.

The foam roller 112 is of polyurethane open cell material fixed to a power driven shaft 113 which is rotated in the opposite direction to drum surface motion, as indicated by the arrows on FIG. 2, so as to compress against and scrub surface 51. The compression/expansion of the open cell foam during this action will tend to draw carrier liquid and any included toner particles remaining on the surface 51 off that surface and into the cells of roller 112.

A cleaning blade 115, comprising a longitudinally stiff, but flexible width-wise, polyurethane wiper blade, is mounted with its edge extending forward and into contact with surface 51, just beyond foam roller 112. Blade 115 acts to wipe dry the drum surface 51, since the photoconductor surface must be dry when it reaches the charging station.

A second printing engine PE2, identical to that just described, is arranged to receive the web material from the first printing engine, and produce other images on the web by electrophotographically using other toner, as of a different color. Due to the digital electronic driving of the printing engines as explained hereinafter, registration of the successively printed images can be adjusted, if need be, on an almost instantaneous basis. Also, it is possible to superimpose a second developed image on the web W over the first image, before setting the first image. Thus, the web path proceeds from engine PE1 to engine PE2, but the web may be threaded through the turning bars 22 so as to reverse the "printed side" of the web and present the opposite side for printing in engine PE2.

Fuser and Dryer

From the transfer apparatus of the second printing engine PE2, the web path leads into the fuser and dryer apparatus (FIG. 1A) comprising an enclosed housing 120 in which the web material is guided between arrays 122 of hot air nozzles mounted on manifolds 124 and arranged transversely of the web path within housing 120, with the nozzles on opposite sides of the web being offset as shown in FIG. 1A. As shown, the web is guided downwardly along an inclined path thus providing greater residence time of the web in the fuser-dryer for a given length thereof.

The flow rate of hot air from the air nozzle arrays is such as to provide an air cushion or bearing for the web as it travels through the dryer. Again, this tends to minimize smearing and image distortion. Heated air at a temperature on the order of around 250° F. is ejected at 5,000 to 10,000 ft./min. from the nozzles as the web passes at velocities in the range of from 100–300 ft./min. Thus the web is kept spaced away from the nozzle arrays and follows a somewhat sinuous path between them.

The hot air performs two functions. First, it volatilizes the liquid carrier material that has been applied to the travelling web. Secondly, it heats the web causing the solids toner particles to fuse onto the desired place on the web. In a typical operation, this requires sufficient heat transfer to remove and vaporize carrier liquid at rates of about 850 grams/min. and higher. Volatiles and hot air in housing 120 are withdrawn through a filter by a downstream exhaust fan 125, and pass to heat exchanger 127. During startup and at other times when auxiliary heating is required, an electrical resistance heater 128 is operated to provide supplementary heat.

Downstream of the heat exchanger, the volatiles and hot air enter catalytic converter 130 wherein, in conventional manner, the volatile organic materials are exothermically converted into carbon dioxide and water, and hot effluent exhaust air from converter 130 passes to recycle duct 132. A portion of the hot effluent air from the catalytic converter is diverted into bypass duct 133 and heat exchanger duct 134 to heat the vented volatiles-hot air from exhaust blower 125 prior to admission thereof into catalytic converter 130. The portion of heated effluent from converter 124 diverted through the heat exchanger is then passes to exhaust port 132. A damper 136 is provided in bypass duct 133 to regulate back pressure in the system and to aid in regulating the amount of hot effluent air from the catalytic converter that is passed through heat exchanger 127.

The portion of hot air from converter 130 which flows on through recirculator duct 132 is returned to the air manifolds 124 through a control damper 138, via a supply fan 140, and thence through equalizer dampers 142, 142A to supply hot air for the drying and fusing of toner. After the initial heat required for starting the process is provided by resistance heater 122, it can be turned off with heat supplied to the dryer being derived entirely of heated gases from catalytic converter 130.

Fresh make-up air enters via duct 144, controlled by damper 145 to admit a regulated volume of fresh make-up air to the inlet of supply fan 140, downstream of damper 138. If desired, hot exhaust gases from housing 120 may optionally be drawn through filter 147 and control damper 148 to recycle exhaust air (including volatiles) to manifolds 124.

The fuser-dryer apparatus thus is a recuperative system which effectively controls emissions from vaporization of the carrier liquid and recovers the resulting heat to further the fusing and drying process.

The web material exiting the fuser-dryer (FIG. 1B) is guided around a rotating chill roll 150 in chill unit 24, where the back side of the web material is kept in contact with the cooled roll 150 for a substantial part of its periphery. This serves to reduce the temperature of the web material to approximately ambient temperature. The chill roll 150 is also driven from a gear box 38 (see FIG. 1B) and the rotational speed of the chill roll is controlled by a conventional speed adjuster 152, which in turn is governed from the main controller 45 (see FIG. 1A). This provides for a constant and positive tension in the web material progressing through the printing engines and the fuser-dryer apparatus.

Processing Section

From chill roll 140 the web material is transported to processing section 25, the rotating elements of which are driven synchronously with the printing engine PE1 and PE2 via line shaft 40 and corresponding gear boxes 38. This section provides, as required for a given job, cross-perforations, feed holes (which are usually located regularly spaced in margins of a text image), longitudinal perforation, file holes or other special notching for each form, and partial perforations as might be needed to define a separable section of a form. Details of such processing units are disclosed in U.S. Pat. No. 4,177,730. The cross perforation and file punch units may include interchangeable cartridge-style mechanisms for variable size accommodation, as is available in the Harris Graphics VS 1220 forms press currently available from Harris Graphics Bindery & Forms Press Division, AM International Inc., Dayton, Ohio 45414.

Depending upon the number and complexity of these various processing functions, the speed of the press may have to be adjusted. In general, the more complex are the processing operations, the more the overall press speed must be reduced to avoid undue waste due to jamming or processing errors. In practice this speed adjustment is left to the judgment of the press operator and his supervisor, who control the over-all press speed via the programmable controller 45. These persons consider a relatively wide range of speed variation to be a necessary capability of a forms press. Thus any printing engine using electrostatic imaging and development must be able to accommodate such speed changes without complex adjustments of exposure and development duration and timing, while maintaining quality of the printed images. In the embodiment disclosed web speeds from 100 ft./min. to 300 ft./min. are available.

Controller 45 is a form of standard programmable logic controller which is commercially available, and it is accessible from the operator's console/terminal. The press operator can select and set the desired web speed for a job to be run, and the controller will accelerate motor 42 to that speed and maintain it for the duration of the job, assuming there are no interrupts. In addition, controller provides from an internal look-up memory table, signals which will change certain operating conditions in the press as follows.

Voltage applied to transfer corotron 92,
6200 V DC at 100 ft./min.
6700 V DC at 300 ft./min.
Voltage applied to charging corotrons 52,
5100 V DC at 100 ft./min.
6400 V DC at 300 ft./min.
Voltage applied to development shoe 80,
75 V DC at 100 ft./min.
500 V DC at 300 ft./min.
Voltage applied to reverse metering roll 90,
100 V DC at 100 ft./min.
500 V DC at 300 ft./min.
Power applied to all LEDs in array 70,
7 V DC and 30 amp. at 100 ft./min.
15 V DC and 65 amp. at 300 ft./min.
Toner flow control valve 87A set to,
5 gal./min. at 100 ft./min.
9 gal./min. at 300 ft./min.

At intermediate speeds the foregoing controls follow a straight line variation between the values for 100 and 300 ft./min.

Web Delivery

Upon exiting the processing section, the web can be handled in different ways, as may be desired. For example the web may be rewound in a rewind section (FIG. 1B) wherein a rewind drum 32D is driven from line shaft 40 and forms a roll of the completed web material. Such an arrangement can be used, for example, if the printed web W it is to become one of several parts of a multi-part form, in which case several similarly prepared webs can be assembled in a collator, as described for example in U.S. Pat. No. 3,727,908.

If the completed web product from this apparatus is intended to be used directly in a continuous printer output of some forms preparation equipment, then the web material W may be zig-zag folded by attaching a conventional folder apparatus 34 at the press delivery section 30, as shown in FIG. 1B. Forms of zig-zag folders are disclosed in U.S. Pat. Nos. 3,980,291 and 3,912,252.

Should it be desired to separate the printed material on web W into separate pieces, then a suitable sheeter and batch delivery 33, of conventional design, can be attached at the press delivery 30.

Image Information System

Figure 4:
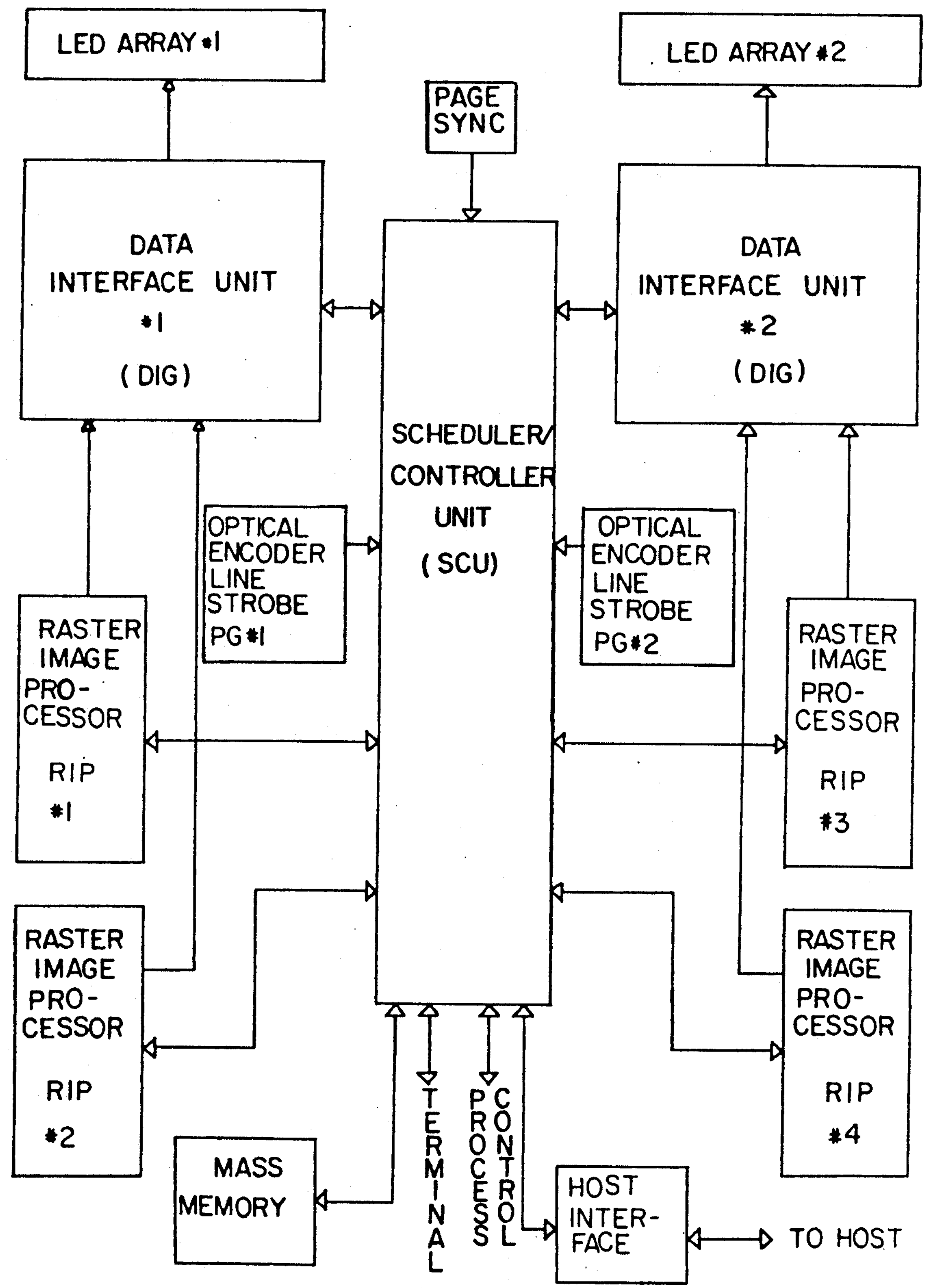
FIG. 4 is a block diagram of the digital imaging system architecture for driving the printing engines.

FIG. 4 illustrates the general organization or architecture of the equipment for assembly and processing of digital image information, which ultimately is used to drive the LED arrays 70 in the imaging device 54. The press is a high speed electronic/mechanical apparatus with capability for on demand printing. It can print "variable data" in real time and has the capability to merge variable data with prerasterized images stored in the system. These pre-rasterized images, referred to as "base forms", can be stored for repeated printing.

The digital electronic imaging system interprets instructions provided by a user through the HOST interface. It controls the digital data flow within the press and merges fixed and variable images for each unique page to be printed. The HOST system is any system, typically a microcomputer, minicomputer or larger, that provides a stream of instructions and variable data in the required format.

The digital electronic imaging system provides electronic printing capabilities for high speed presses, incorporating both fixed and variable images on a page-by-page basis. The four basic components of the imaging system are the Scheduler Control Unit (SCU), the Raster Image Processor (RIP), the Data Interface Unit (DIU), and the LED array (see FIG. 4). The controlling intelligence behind the imaging system is accomplished through the SCU.

The SCU provides the top-level system synchronization for the imaging system. It synchronizes all print data to the web, prepares all imaging resources that are required, channels text data from the host computer, and controls all data transfer through the system. The SCU will control the two print engines PE1 and PE2. Each print engine will have associated with it one RIP and its own DIU and LED array. In a successful embodiment the SCU is a Motorola 68020-based VME system running UNIX and RTUX (see FIGS. 5 and 6). RTUX is a real-time system that co-resides with UNIX.

Figure 6:
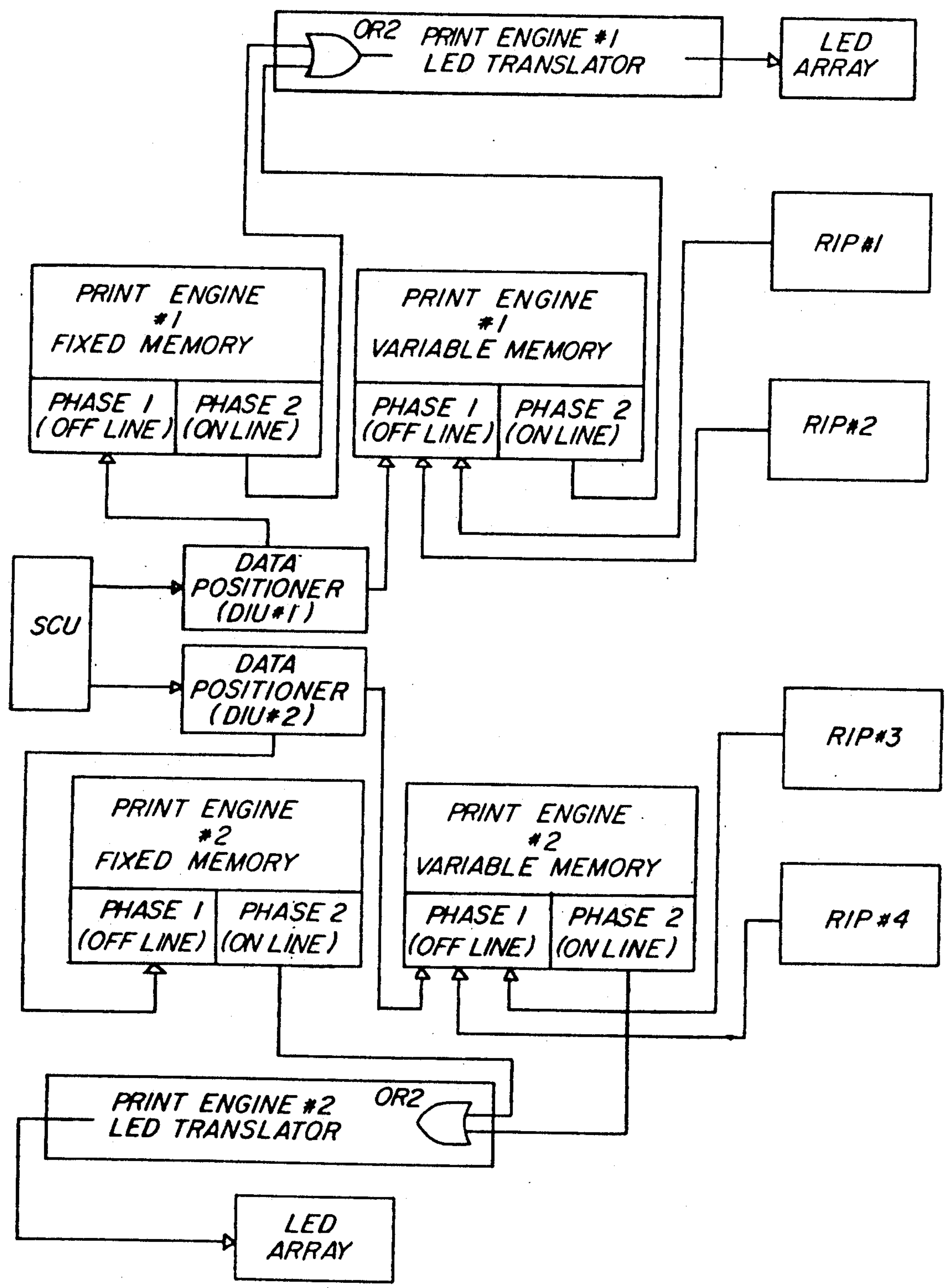
FIG. 6 is a diagram of the data interface units (DIU) and associated memory planes for driving the digital LED exposure arrays.

A raster image processor (RIP) is the hardware used to compose a series of ASCII characters and translate them into the proper bit-map forms based on the font(s) selected. Raster processing or character generating circuits are per se known, and are commercially available. A "font" in this system is considered to be the text style and size in which the variable images may be printed. Special designs, logos or the like, can be considered as a separate font, which may contain only a few characters. In an actual embodiment a DIU constitutes 25 MB of RAM, organized into rows of 6144 bits (the number of LEDs in the arrays) by 8192 rows which holds the bit-mapped information for one image. The DIU contains all the storage and location circuitry required for storing text and baseforms in rasterized bit-map format with, in the described embodiment, enough memory for two images. Thus, FIG. 6 shows each DIU functionally divided into fixed and variable memory sections. Typically, the fixed memory would hold the base form data (see example following), and the variable memory would hold variable data, as might change each image, received from the RIPs. It also provides for reading of the DIU memory on a one line at a time basis to transfer, line-by-line, image information to the LED array 70. The LED array exposes the non-image areas of the photoreceptor surface 51 to print the images on the web.

Figure 5:
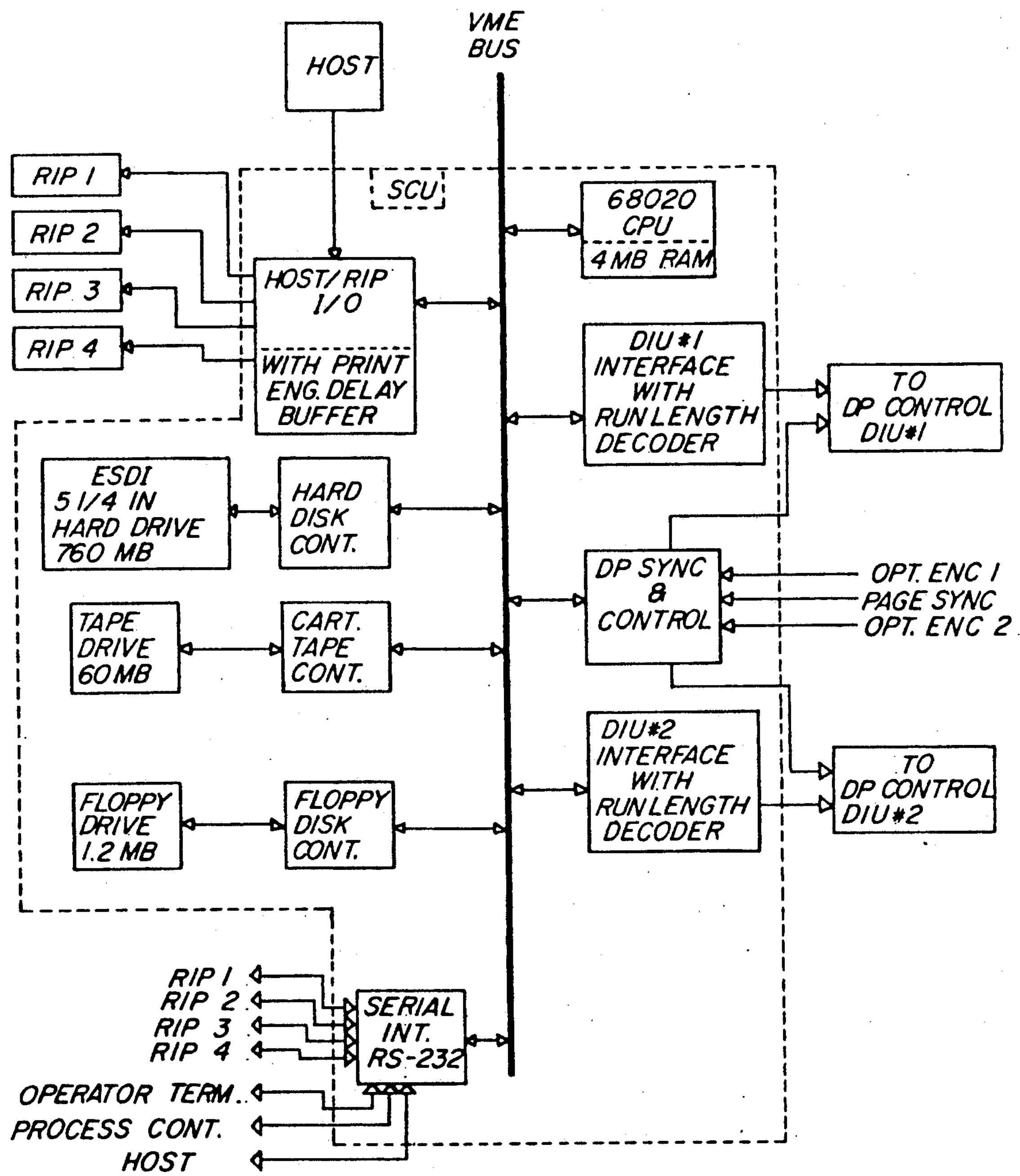
FIG. 5 is a diagram of the scheduler/controller unit (SCU) which is the principal controlling unit of the imaging system hardware shown in FIG. 4, including the SCU's information exchange with a host computer.

FIG. 5 shows the organization of the various hardware components which are a part of the SCU, operating through the VME bus and interfacing the SCU with the four RIPs, the operator terminal at the press, the host computer, the DIUs for each print engine, and the sources of sync signals. These components include a four Mbyte RAM, interface circuits to the DIUs, the sync input/output circuits, the host/RIP input/output controller and print engines delay buffers, a 760 Mbyte hard disk drive and controller, a 60 Mbyte tape drive and controller, a 1.2 Mbyte floppy disk drive and controller, and an RS-232 serial interface.

FIG. 6 shows that each DIU feeds an LED translator circuit, which includes shift registers for storing the LED driving information for one line while the information for the next line is being loaded into the translator circuit through which data is sent to the LED arrays 70, and these in turn receive information from both the fixed or baseform memory and the variable memory of the DIU associated with a given print engine. The variable memory in turn receives data from two RIPs. The SCU, through a data positioner circuit, controls the flow of data from the two DIUs to their corresponding print engines and combines fixed and variable data as needed to expose a page of information as an electrostatic image on the drum surface. The data from the bit-mapped memory is clocked into the LED translator under control of the SCU at a rate which is greater than the fastest usage of the data to refresh the state of the LED drivers for each line. In a successful embodiment the array 70 is divided into twenty four modules of 256 LEDs each, and the data is loaded serially into the shift registers for each module while being transmitted in parallel to each module. In other words, data is loaded simultaneously as to all modules, but sequentially into each module.

The DIU contains all the storage and location circuitry required for storing text and baseforms in rasterized bit-map format. In an actual embodiment a DIU constitutes 25 MB of RAM, organized into four memory sections, each of which have rows of 6144 bits (the number of LEDs in the arrays) by 8192 rows to hold the bit-mapped information for an image. Pairs of these memory sections cooperate with each other to provide bit-mapped fixed (e.g. base form) and bit-mapped variable image data. In use one pair of memory sections is scanned to output data to the registers at the LED array, while the other pair is loaded with data. Thus, for the described embodiment enough memory is available in each DIU for both the base form and variable information for two images. The SCU controls the input and output of data to and from the DIUs, and transfers, line-by-line, images to the LED array 70.

Figure 7:
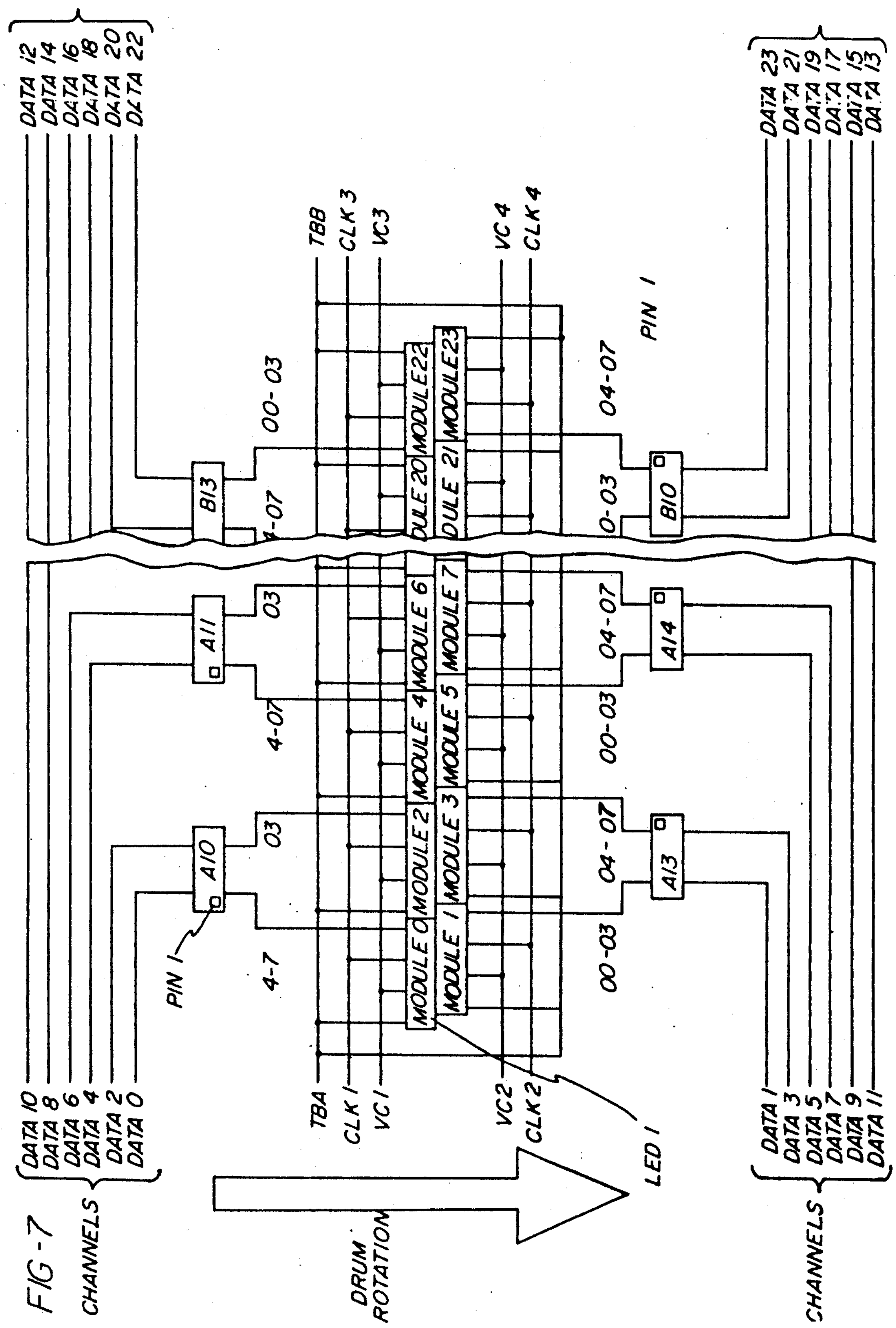
FIG. 7 is a block diagram of the parallel data and timing inputs to the various modules which make up the array.

Referring to FIG. 7, array 70 is divided into twenty four modules (marked M-0—M-23). It will be appreciated that for ease of illustration only the first seven and last four of the modules are illustrated. Each module contains 256 LEDs in a row, preferably fabricated in an elongated strip. Referring to FIG. 7, it will be noted that the blocks of LED assemblies are arranged into two rows, with the space between adjacent LEDs in one row being aligned with the centers of the LEDs in the other row. This allows close packing of the LEDs without crosstalk between adjacent ones. The driving of the LEDs in the second row is simply delayed by the time required for the photoreceptor to move a row of pixel areas from one row to the next, and the result is that all pixel areas across every row on the photoreceptor can be exposed, or not, to an appropriate light whereby the background regions are discharged as already explained.

Data is loaded from the DIU over twenty-four parallel data channels, marked DATA 0—DATA 23, serially into EPROM circuits which in turn feed data to the registers within the modules. The data channels lead to two banks of EPROM circuits A-10 through A-15 and B-10 through B-15 (only EPROMs A-10, A-11, A-13 and A-14, and B-10 and B-13 are shown in the drawing).

The output of the EPROM circuits is a series of four-bit data words derived from correction or compensation information stored into the EPROMs. This output is directed to the modules along the four data lines (DATA 0-3) as shown in FIG. 9 running from EPROM A-10 to Module 1 and Module 2. The four inputs labelled TB 0-3 are timing inputs for controlling distribution of data by comparator circuits into the various LED driver circuits. The timing inputs are received from the DIU over paired data lines TBA 0—TBA 3 as shown in FIG. 8, and its use is explained below.

Figure 10:
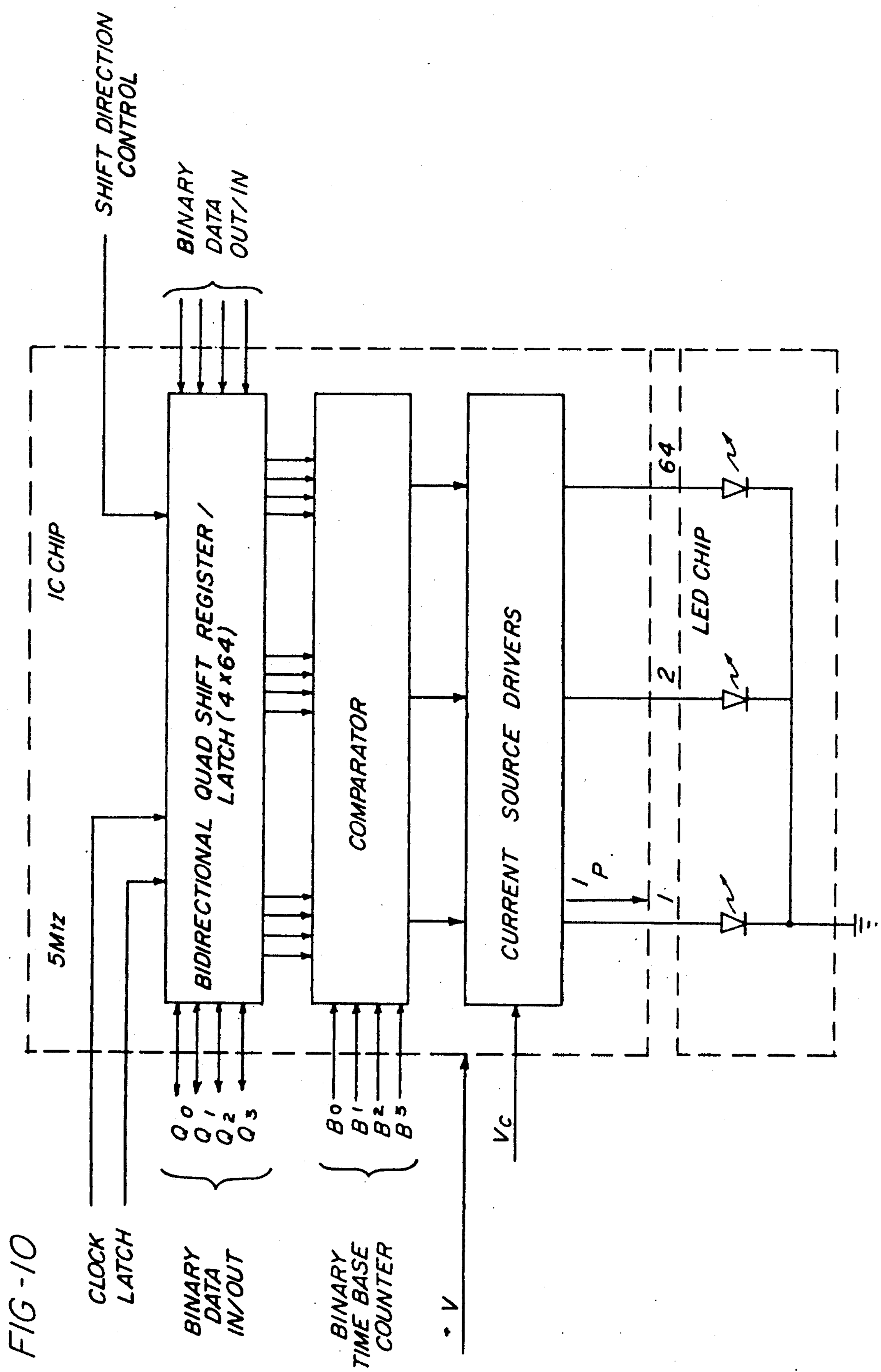
FIG. 10 is a block diagram of the circuits of one module, illustrating the manner in which data is handled to drive each LED in the array.

FIG. 10 shows in block diagram form the arrangement of data register/latch and driver circuits within a module for the 256 individual LEDs in that module. There is a current-source driver for each LED which will apply driving power to the LED for generating a small light beam onto the drum surface 51 at a given pixel location. Each driver circuit is in turn driven from a comparator circuit which also receives timing (or commutating) information for serial distribution of the LED driving data to the individual LED drivers circuits.

It is a characteristic of any LED array that the individual LEDs will exhibit some variation in output light intensity even though they are all driven at the same potential with the same current. Thus, when the arrays 70 are constructed, and the twenty-four modules of 256 LEDs each are mounted in predetermined closely spaced positions, the LEDs are each individually energized and their outputs measured and recorded, as by a photometer. The resulting information is translated into correction data which is then stored in the EPROMs. Then, when the writing data instruction is transferred from the DIU to the EPROMs, they in turn output appropriate four-bit data words or instructions to the register/latch circuits in the modules. Thus, the basic writing data input signal is modified, actually expanded, according to the stored information in the EPROMs, to modify the time duration of the driver output, as explained later. It will be appreciated that the shift registers for each module are loaded serially, while data is transmitted in parallel to each module. In other words, data is loaded simultaneously as to all modules, but sequentially into each module. Thus, referring to FIG. 7, data moves over twenty-four parallel data channels from the DIU to the input side of the LED array; these data channels are shown divided top and bottom between the upper row and lower row array modules, and right to left of the array, and (as previously mentioned) are labelled DATA 0 through DATA 23. The data channels lead to two banks of EPROM circuits A-10 through A-14 and B-10 through B-23 (only EPROMs A-10, A-11, A-13 and A-14, and B-10 and B-13 are shown in the drawing).

Figure 8:
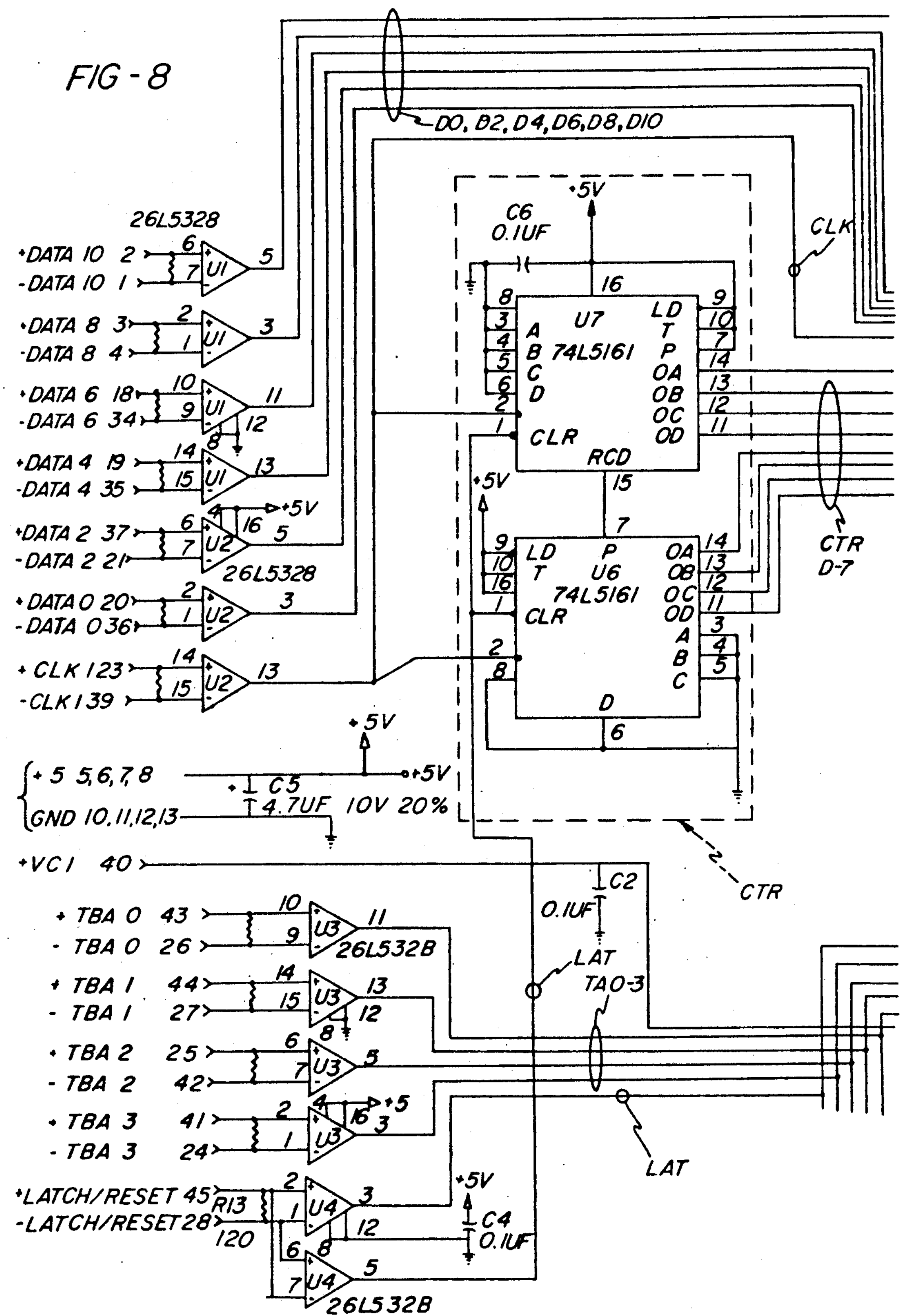
FIGS. 8 and 9 are, taken together, a circuit diagram of the power, data, and timing inputs to one module of the array; a small portion of each figure is a duplication of the other where they adjoin, to aid in viewing them together.
Figure 9:
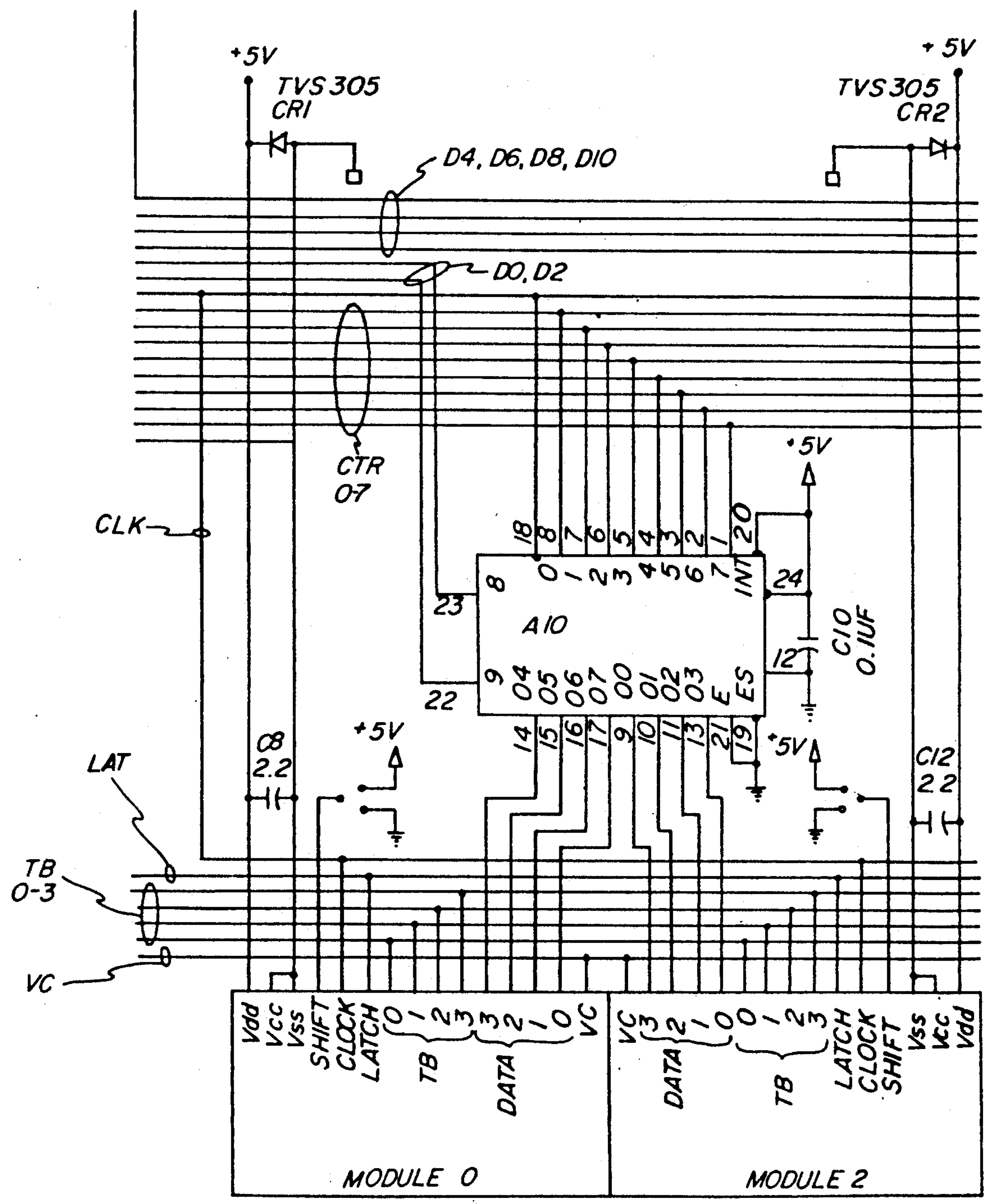

Referring to FIGS. 8 and 9, data along with the 5 MHz clock comes from the DIU through paired data lines labelled +CLK 1/−CLK1 and +DATA,−DATA 1 through 10; these correspond to the even numbered data lines (DATA 0—10) at the upper left corner of FIG. 7, and are representative of the entire data transmission (DATA 0 through 23) from the DIU to the LED array as shown on FIG. 7. The paired data lines are input to conventional driver circuits (type 26LS32B). The clock signal is directed through a driver circuit to a pair of counter circuits (U6 and U7) which are connected to provide a 1-256 counter CTR, and the clock signal is also connected to the CLOCK input of each of the EPROMs and of the register/latch circuits in the various modules, as seen in FIG. 9. The write data signals are directed from the data driver circuits to each of two data inputs at all the EPROMs.

Counter CTR has eight output lines CTR 0-7 which are connected to the corresponding inputs 0-7 of each EPROM (FIG. 9) and over which a count (in binary code) is sent to enable the respective EPROMs to receive on-off writing (pixel initiating) data for each pixel location. Thus, data arrives from the data driver circuits (FIG. 8) over lines D0, D2, D4, D6, D8 and D10 which are connected to the various EPROMs (two modules are served by one EPROM); data lines D0 and D2 are shown connected to the EPROM A-10 for Module 0 and Module 2 (FIG. 9). In turn, the EPROMs have data outputs in the form of binary code via four data lines, which extend to the shift register/latch circuits of each module (see FIG. 10) and which include the comparative data for each LED. These are shown as the inputs DATA 0, 1, 2, 3 on Module 0.

As mentioned, the EPROMs are programmed to store comparative data concerning the relative light output intensities of the LEDs in the array. In operation this writing data is clocked out of the DIU memories and into the EPROMs at, for example, 5 MHz. Thus all EPROMs are interrogated for information to drive all LEDs for the "next" line of pixels during a period of 51 microseconds. The LED driving data (as earlier explained) is a four-bit code, comprising sixteen discrete numbers; a zero represents an "off" condition, and numbers one through fifteen depict compensation information for the LEDs as stored in the EPROMs. This driving data is transferred under control of the same clock into the latch/registers of the modules. Thus a line of pixel initiating or writing data is transferred from the DIU to the EPROMs, enhanced with the compensation data, and is serially transferred into the latch/registers of the modules, ready for subsequent use in the function of actually driving the individual LEDs.

Compensated LED Driving

An encoder pulse generator PG (FIGS. 2 and 4) is driven from the shaft of drum 50 and provides outputs equal to one-eighth of a pixel height, i.e. eight pulses per pixel dimension around the drum. That output divided by eight is the source of the latch pulse train, each latch pulse coinciding with the top border of a line of square pixel areas across the photoreceptor surface. FIG. 11 shows the relationship of data in clock pulses, latch pulses, and timebase pulses. Due to the variable speed capability of the apparatus, the duration of successive timebase pulses will vary considerably, but there will always be just sixty-four of them; at a web speed of 100 ft./min. the latch pulse rate will be 6 KHZ, while at 300 ft./min. this rate will be 18 K Hz. Latch pulse width in all instances is in the order of 60 nsec, but it will be appreciated the sixty-four timebase pulses will be adjusted to the latch pulse rate.

The SCU receives the PG outputs (for each printing engine) and divides the time between leading edges of successive latch pulses by sixty-four, and generates a time base count which equals 1/64th of the latch/reset interval. This represents the maximum time, at a chosen drum and web speed, during which an LED can be driven. This timebase information is sent to the time base drivers and to a pair of latch/reset drivers (FIG. 8) over the paired time base lines TBA 0—TBA 3 and the latch/reset pair. The four timebase signal lines and the latch/reset line are designated TB 0—3 and LAT. The LAT signal leads to the latch/registers, and the TB 0—3 signals are directed to the comparator circuits (see FIGS. 9 and 10). The time between latch pulses in effect represents a time interval or window during which the LEDs may be driven, depending upon the state of the driving data previously stored in the latch/registers for each LED. It will be recalled that this includes the compensation data for the individual LEDs. As to each LED, if there was an "on" signal in the pixel originating data, then the driving data will indicate that the LED is to be driven for at least a predetermined minimum of the entire interval between latch pulses.

As shown on FIG. 11, if a particular LED is to be energized, it will be powered (i.e. driven) for no less than 54% of the timebase interval, the duration of the minimum "on" signal. The comparative data will determine the extension of on-time into the optional band of fourteen timebase counts, before and after the "basic" string of timebase counts, by increments of two timebase counts, one before and one after the basic "on" signal. There is thus a gradation of effective "on" signals to each LED which is to be driven, and this gradation will change with drum (and web) speed since the timebase interval, and the duration of each timebase pulse, will change as the encoder PG changes speed along with the drum. Also, the increase/decrease of LED on-time is centered about the minimum on-time, which in turn occupies the middle thirty-six of the total sixty-four timebase pulses, regardless of drum and web speed.

As mentioned, the SCU receives the encoder (PG) outputs and divides the time interval between successive latch pulses by sixty-four, and outputs a corresponding number of timebase counts or pulses during that interval. These are supplied to the comparator circuits in the modules; the connections to Module 0 and Module 2 are shown in FIG. 9. Assuming an LED is to driven, the four-bit binary code over lines TB 0-3 will determine which of the first fourteen timebase pulses will first enable the corresponding driver circuit. In effect the time base count decrements from 14 to 0, followed by thirty-six counts during which the driver circuit is enabled, then the count progresses up to 14 (see FIG. 11 "timebase count"). Thus, information over lines TB 0-3 provides the sequential timebase pulses to the comparators (FIG. 10) to define the potential on-time of an LED, and also combines with the compensated driving data from the latch/register.

Also the latch pulses are transmitted to latch/reset drivers (FIG. 8) which have outputs LAT to the module latch/registers and to counter CTR to reset them each time sixty-four timebase counts have occurred, e.g. in time for the next row of pixel areas.

In the example shown in FIG. 11, the particular LED to be driven (LED output) requires the minimum driving, so its driver output begins at timebase count fifteen, and ends after timebase count fifty. If the comparative information calls for greater driving time, the driver circuit will be enabled at some timebase count less than fifteen and disabled after a corresponding count greater than fifty.

It should be emphasized that these timebase pulses are not specific times, but each timebase pulse is variable since the latch interval varies with drum and web speed. In the preferred embodiment, writing data is loaded into the EPROMs A-10 etc. at an SCU clock rate of 5 MHz. That results in all twenty-four modules having data for one line loaded in approximately 51 microseconds. Compensated data is transferred to the latch/registers at the same rate and is transferred cut of them to power the driver circuits, in cooperation with the comparator circuits, at between approximately 56 and 168 microseconds, depending upon press speed and latch pulse rate. Thus, it can be seen that "exposure time" for any given pixel will be between about 30 and 56 microseconds at 300 ft./min. web speed and between 90 and 168 microseconds at 100 ft./min.

As shown in FIGS. 7–10, the control voltage $V_c$ for the current-source driver circuits is derived from a separate source which in turn is controlled through the press drive motor speed controller 32. Thus, as drum and web speed increases this voltage is also increased. Typically this voltage varies from 7 V DC at 100 ft./min. to 15 V DC at 300 ft./min. In this manner, additional compensation, uniform as to all driver circuits, is introduced to offset the decrease in exposure time for a single pixel area on the photoreceptor surface as drum and web speed is increased.

Operator-System Interface

Terminal Hardware

The imaging system implementation utilizes a color CRT industrial terminal (XYCOM model 4850-A 12 inch). This terminal is used as an interface to the imaging system itself. The host uses a separate terminal, and the press itself utilizes a third terminal which includes the drive controller 45. Some operator input requires use of a full-function alphanumeric keyboard, which is provided, but operator interface is designed to keep the use of this keyboard to a minimum.

Menu Interface

The imaging system is driven by various logical modes or states, and various paths of transition between the modes. Each logical mode has a specific set of functions and capabilities associated with it. Printer Options (examples hereafter) are a set of utilities which do not alter the current printing mode, but provide functions necessary for press operation and configuration, and are dependent on the current press mode. The menu interface is geared around these printing modes and associated printer options. Following is a description of the various capabilities and transitions of each mode, and how each mode fits into overall job flow. In addition to mode functionality, the menu interface will also provide dynamic information as to the current status of the imaging system.

Logical Modes

There are eight logical press modes which deal directly with the menu interface. Those are the seven menu interface modes and the Start Job mode, which is important in the discussion of the job flow. The Printer Options command is listed on every menu mode screen except for Maintenance. Choosing the Printer Options command provides a sub-menu listing all the available options for the current mode. Besides the Printer Options command, each mode screen has a set of commands allowing transition to different modes, and a structured job flow. Each mode, with its set of commands and Printer Options capabilities is listed below.

Idle

The Idle mode exists when there are no current jobs running or being processed to run, and when the press is not in a test print or maintenance mode. Commands:

1. Printer Options—The printer options are a) Press Parameters, b) Job Control, c) Font Libraries, d) Base Form Libraries.
2. Start Job—When Start Job is executed, transition will go to Start Job mode.
3. Test Print—When Test Print is executed, transition will go to the Test Print mode.
4. Maintenance—When Maintenance is executed, transition will go to Maintenance mode.

Start Job

The Start Job mode reads in the job header data for the next job from the host. If the job header is valid and the SCU successfully loads the resources for the job, a mode transition will take place either to Make Ready or Run Job modes, depending on the job flow parameter. If there are errors in the job header, transition will go to Make Ready with a job header error condition (explained in the Make Ready mode description below).

Test Print

Test Print will continuously print a generic test pattern on the press.

Commands:

1. Printer Options—a) Press Parameters, b) Job Control, c) Registration
2. Stop Test Print—When executed, test pattern imaging will cease and transition will go to Idle mode.

Make Ready

Make Ready is the front-end preparation mode for a new job. If a job header error exits, e.g., the toner required for a job as specified in the job header not matching what is on the press, then Make Ready will indicate the error and allow correction by the operator. Make Ready will continue to validate the job header data, and check inconsistencies between the job header and current indicated press resources, indicating the problems, until all errors are corrected, or until the operator cancels the job.

Commands:

1. Printer Options—a) Press Parameters, b) Job Control, c) Job Parameters, d) Font Libraries, e) Base Form Libraries
2. Proof Print—When executed, transition will go to Proof Print mode.
3. Run Job—When executed, if all job header data problems are resolved, transition will go to Run Job mode.

4. Cancel Job—When executed, the SCU will send the Cancel Job Command to the host. Transition will go to Idle mode if the job flow is manual, or to Start Job mode if the job flow is continuous.

Proof Print

Proof print will continuously print the same copy of the current page, with all page flow from the host halted. If the current page number is zero (Proof Print executed from Make Ready), the first page will be taken from the host and used as the current page.

Commands:

1. Printer Options—a) Press Parameters, b) Job Control, c) Job Parameters, and c) Registration
2. Stop Print—When executed, imager printing will cease and transition will go to Stop Print mode.
3. Run Job—When executed, transition will go to Run Job mode.
4. Cancel Job—When executed, the SCU will send the Cancel Job Command to the host. Transition will go to Idle mode if job flow is manual, or to Start Job mode if job flow is continuous.

Run Job

Run Job is the normal run state of the press. All regular job flow, as dictated by the host, is processed, until an error occurs or the end of job is detected from the host. If an error occurs that is considered a Stop Press condition, then transition will go to Stop Print mode. If the job terminates normally, and if job flow is continuous, transition will go to Start Job mode. If job flow is manual, transition will go to Idle mode.

Commands:

1. Printer Options—a) Press Parameters, b) Job Control, c) Job Parameters, d) Registration
2. Stop Print—When executed, transition will go to the Stop Print mode.
3. Cancel Job—When executed, the SCU will send the Cancel Job Command to the host. Transition will go to Idle mode if job flow is manual, or to Start Job mode if job flow is continuous.
4. Restart Job—When executed, the SCU will send the Restart Job Command to the host. Transition will go to Start Job mode.

Stop Print

Stop print will stop all imaging of the current job and halt the job flow.

Commands:

1. Printer Options—a) Press Parameters, b) Job Control, c) Job Parameters, d) Font Libraries, and e) Base Form Libraries
2. Proof Print—When executed, transition will go to Proof Print mode.
3. Continue Job—When executed, transition will go to Run Job mode.
4. Cancel Job—When executed, the SCU will send the Cancel Job Command to the host. Transition will go to Idle mode if job flow is manual, or to Start Job mode if job flow is continuous.
5. Backup Job—When executed, the operator will be prompted for the number of pages to back up. The SCU will send the Backup Job command along with the number of pages to back up to the host. Transition will go to Run Job mode.

Maintenance

The maintenance mode is used to provide routine service and diagnostics for the imaging system.

Commands:

1. RIP Service
2. DIU Service
3. Host Service
4. Backup System—When executed, will backup to tape critical portions of the SCU software and operating system.
5. End Maintenance—When executed, transition will go to Idle mode.

Printer Options

Press Parameters—Displays resources currently resident on the press, allowing operator modification. Since the imaging system does not know what is installed on the press with respect to these resources, the operator can visually verify that Press Parameters match what is actually on the press. Examples of such press parameters are paper code, PE-1 color, PE-2 color, and knife sync type (internal, external, or none).

Job Control—Displays the current configuration for job flow and whether or not certain conditions constitute the stopping of the imaging system.

Job Flow—Job flow may be manual or automatic. A manual job flow will cause the SCU to enter the Idle mode and then the Make Ready mode, respectively, before the next incoming job can be run. Thus, the operator will be required to initiate the printing of every new job. However, when job flow is automatic, the SCU will go directly to Start Job mode when a new job is indicated from the host. Thus, job-to-job printing will be automatic if there are no header data errors detected.

Optional Stop Press Conditions—Certain conditions may warrant the stopping of the imaging system, or instead a warning with no stoppage. These conditions are selectable. Examples of Optional Stop Press Conditions are:

Late composition—The imaging system was unable to compose a page for print in the allotted time. This condition is affected by press speed, and the amount of variable data composition required per page.

Undefined window—A variable window indicator is received from the host which references a window not defined in the job header.

Bad host data—An undefined command code or escape sequence is received from the host.

Host timeout—In the middle of a print, no host data was received for a specified amount of time.

Number of total pages exceeded—Printing the total number of pages, as indicated in the job header, has not resulted in an end-of-job indicator from the host.

End of job detected before total pages reached—An end-of-job indicator is received from the host before the total number of pages, as indicated in the job header, have been printed.

Job Parameters—Displays all information on the current job, as received from the job header, allowing for modification of fields detected by Make Ready as possible errors.

Registration—Allows for the registration of the currently printing image, using as references print engine PE-1 to print engine PE-2, and print engine PE-2 to the knife sync. Registration units are in fraction of an inch, translated to the number of dots or pixels, based on 300 dots per inch.

Font Libraries—Allows for the inquiry, modification, and backup of the current font library. Fonts may be added to the library from tape or diskette.

Baseform Libraries—Allows for the inquiry, modification and backup of the current baseform library. Baseforms may be added to the library from tape or diskette.

Printing a Job

Printing is accomplished by the imaging system on a job-by-job basis. A "job" is considered to be a run of printed pages, all of which use the same on-line resources. The resources which a job may require are made up of baseforms and fonts. A "baseform" is the fixed image which remains constant throughout the life of a job. A job may be identified in terms of its baseforms(s), if it uses them. All variable information is printed in "windows", which are rectangular locations on the page, positioned relative to a corner of the page.

Figure 12:
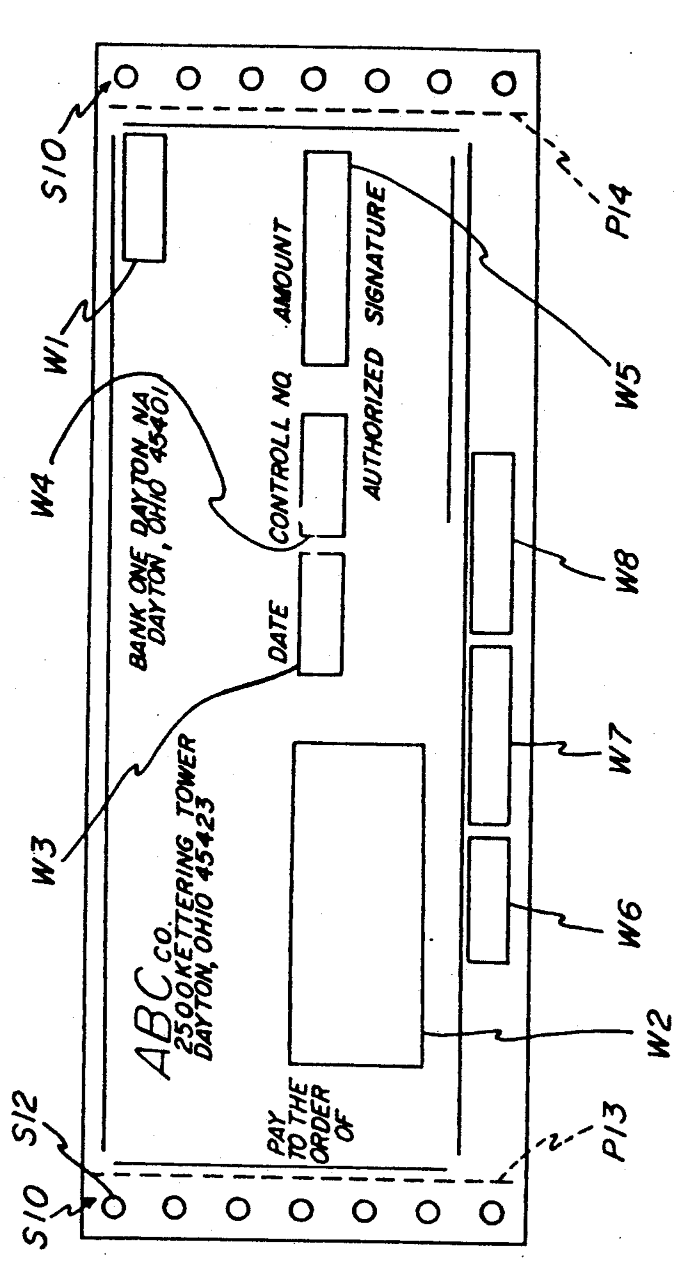
FIG. 12 is a diagram illustrating programming codes format.

A typical job would be printing a series of accounts-payable checks for a company, an example of which is shown in FIG. 12. The baseform in the example is comprised of fixed data including the check design, such as a square border, border boxes for the check amount, date, and number, and the company's (payor) name and address, the company/payor's account number in MICR code, the bank name and its identification in MICR code, and other text. The variable data is comprised of the check number (in both block numerals and MICR code), the date, the amount, and the recipient's (payee) name and address, and possibly other information such as a control number for accounting purposes. Variable data may change at different rates. For example, the check number would change every image, whereas the date may not change at all in a job. All variable data associated with a particular window is positioned on the page within that window.

In the check example illustrated, the variable data may be contained in windows as follows: window W1 is for the check number, W2 is for the recipient's name and address, W3 is for the date of the check, W4 is for a control number (optional), W5 is for the amount of the check, W6 is for the check number in MICR, W7 is for the bank identification number, and W8 is for the company/payor bank account number.

Such checks are produced in a continuous format, separable from each other along top and bottom perforations P10 and P12, and having detachable side feeds strips S10 with feed holes S12 defined by side perforations P13 and P14. In a simple format, the check may comprise only a single web or form, as shown. However, such checks are also commonly available as multi-part forms, in which case there will be some or all of the same fixed and variable information on the other form parts. The other part or parts are printed on paper of a different color, overprinted with a "Non-Negotiable" message, and collated into a set of continuous multi-part forms which can be processed through a conventional computer controlled printer. These additional form parts are well known, so they are not illustrated here.

The present invention has the versatility to handle such printing jobs in different fashion. For example, the fixed data and some variable data such as progressive check numbers in block and MICR can be printed onto single or multiple check forms, then supplied in zig-zag folded stacks for use in a printer which will add the remaining variable data. It is also possible to print all the fixed and variable data in one pass through the press, particularly where a single part form is sufficient, by merging more of the variable data into a larger job run on the press of this invention. The latter type of operation might be efficient in cases where large quantities of different jobs are available to be run on the press, or a longer job with considerable variable data is to be run, such as a large number of payroll checks for a large corporation.

Operation Overview

When the imaging system is ready to process a job, the first thing it must do is load that job's resources. The required baseforms are loaded into the DIU, and the required fonts are loaded into the RIPs.

The imaging system gets its commands for each job from a host processor, via a sixteen-bit parallel port which is later described (see Host Interface). These commands instruct the imaging system what resources to load for each job, and then send the variable data for the job when the job is ready to print. When the first job has completed, the host will then send the resource information for the next job, followed by the variable data, and so on.

Processing proceeds as follows. When the host is ready to begin a job, the first thing it will send to the imaging system is the job header data. The job header data will include the baseforms and fonts required to run the job. The baseforms will be stored on the imaging system on hard disk, and must be present when the job is ready to run. Baseforms may be loaded onto the hard disk from tape or diskette. The operator will need to insure that the proper baseforms are loaded before executing a job with baseform calls. The fonts will also be loaded from the hard drive into the RIPs, and must therefore also be present when the job is ready to run. Fonts are loaded onto hard disk in the same manner as the baseforms. Also included in the job header data will be the window descriptions.

After the job header data has been processed and the resources loaded, printing of the job may begin. The host will send the window identifiers and their corresponding data for a page to be printed. Window sizing information and data will be processed by one RIP in each print engine. Windows only need to be sent if their data changes. When the desired windows have been sent, the host will send an end-of-page command indicating that the page is complete. Incorporated in this command will be the number of desired copies of the sent page. The host may then begin sending the data for the next page. When the desired pages have been printed, the host will send an end-of-job command indicating that the job is complete. The host computer may then begin sending the job header data for the next job. The imaging system will begin loading resources for the next job, if available, with a down time between the jobs dependent on the amount of resources to be loaded. The more common the resources between two consecutive jobs, the less the down time. The input format for a job is as follows:

Start of Job
Job Header
End of Header
Window Flag
Window RIP codes
Window Text Data
Form Feed End of Page
[next page instruction]
End of Page
End of Job
[Start of next Job]

Press Registration

Various registration modes allow for either print engine to run as a primary or as a secondary unit. The primary print engine can synchronize to different software selectable sync sources or can operate in a page roll-over mode without synchronization. The secondary print engine synchronizes to the primary print engine.

Hardware

External Sync—The external sync input can be used as a sync source for either print engine. It is provided to the imaging system as in RS-422 differential signal. The negative going edge triggers the print engine. The signal must remain low for at least 100 nsec. A sensor MS 1 is mounted along the web path (FIG. 1A) ahead of the first engine PE1 and can function to detect a mark or target (not shown) which is typically printed along the margin of a preprinted web which may be loaded into the supply roll 10. The output of sensor MS 1 can be applied to the external sync input to register information printed by engines PE1 or PE2 to images preprinted on the web.

Knife Sync—The knife sync input may be used as a sync source for either print engine. It is provided to the imaging system as an active low TTL open-collector signal. The negative going edge triggers the print engine. The signal must remain low for at least 100 nsec. This signal may be derived from a suitable sensor or pulse generator at an element of the processing section, usually the cross-perforation unit of the processing section, and corresponds to the first cross-perforation blade engaging the web. Suitable sensors (not shown) are also provided associated with the sheeter cut-off cylinder, and the zig-zag folder, when those delivery or output devices are operated independently of a press processing system.

Encoder Clock—As previously explained, the encoder clock for each print engine is provided by the imaging system via a RS-422 differential driver. One clock pulse is provided for every ⅛ of a pixel line (2400 pulses per inch). Each pulse is active high for a period of 100 nsec. Each print engine PE1 and PE2 has an encoder coupled to its drum 50 to generate pulses at this rate as the drum rotates.

Index Pulse—Each print engine has an index pulse which occurs once every drum revolution (every 33 inches). It also is derived from the encoders driven with the printing engine drums. This signal can be used as a sync source for the associated print engine. This source is generally not used in normal printing modes.

Sync Out—Each print engine provides a sync out pulse which indicates when a page has been started based on a sync input. This signal is the print engine sync input plus the offset adjustment plus ½ of the window size if an end-of-window sync has occurred (described below). The SYNC OUT pulse is active low, has a duration of one print line, and is provided by the imaging system on a RS-422 differential driver. If for some reason a sync pulse does not occur in the expected train after a page has begun, this signal will act as a substitute sync signal so as not to cause a default in the operation.

Image Sync Implementation

The imaging system can be synchronized using any one of three externally generated sync pulses (Knife or External) as derived from optical encoders, preprinted paper, or any other source. The choice of synchronization source does not alter the operation of the press. The implementation of the sync pulse (whether used or not), its source (Knife or External), and its spacing (in number of lines) will be specified in the job header. When using an external sync source, the occurrence of either a sync pulse or an end-of-page will cause the print engine to reset to the zero address of image memory and toggle the active memory planes when enabled by the SCU. The end-of-page boundary is written into a register on the DP Sync and Control Board by the SCU from the page length data provided in the job header. If an external sync source is not used, then the end-of-page indication will reset memory to address zero and toggle image planes when enabled by the SCU.

Three different sync modes known as NORMAL, SLAVE, and SOFTWARE are provided.

The NORMAL mode employs a phase-locked-loop to generate a window in which the sync pulses are permitted to occur. This mode is intended to be used when triggering on any external source. The maximum sync pulse separation for this mode is 65,536 lines minus ½ of the window size. The advantages of this mode are the ability to print multiple pages within a sync period and error recovery from missing pulses. The SCU is given information as to the nominal sync period and maximum sync variance in order to set the page and window sizes for the job.

The SLAVE mode makes the print engine a slave to the sync pulse. The print engine synchronizes directly from the pulse received. The sync pulses may have any separation in this mode and no prior knowledge of the sync pulse period or variance is necessary. This mode could be used for jobs which were not set up with a specific page size or have multiple pages per sync period. End-of-page indications will not reset the memory address or toggle image planes, thereby eliminating the possibility of contention between the end-of-page indications and the sync pulses.

The SOFTWARE mode is provided to allow the SCU to sync the print engine, and is used only for diagnostics purposes.

Margin Requirements

Top and bottom margins are required on all imaging system images for two reasons:

1. When triggering the imaging system with an external sync pulse (Knife or External), there must be a white area buffer zone at the beginning and end of the image. This buffer zone is required to prevent the loss of printed information at the edges of each page due to variations in sync pulse separations. This buffer zone should be larger than the maximum variance of the sync pulse separations. The buffer zone is defined as ⅛" at the top of form and ⅛" at the bottom of form. This requires that the window size be no greater than ¼".
2. There is a mechanical LED offset in the array 70 that is compensated for by clocking out data "early" or "late". In order to prevent visible printed data at the beginning and end of a form, the top and bottom of the image must have at least six lines of white data. Six lines of data at 300 dots/inch corresponds to 0.02 inches. These twelve lines (0.04 inches) can be embedded into the triggering buffer zone, and need not be added to the buffer zone spacing. Normal Sync Mode The sync pulse occurs coincident with the end-of-page indication, but system tolerances are such that they do not match exactly. To eliminate the possibility of both a sync pulse and an end-of-page indication resetting the print engine and thus causing a double memory plane toggle due to a small separation in their timing, the primary print engine will set up a window of time where the sync pulses may occur. This type of implementation also allows for multiple pages per sync period.

The position of the window is based on the sync separation of the previous valid page by means of a phase-locked-loop. Only the sync pulse is allowed to trigger the reset of image memory and the toggling of memory planes during this window. All end-of-page indications are ignored during this time period. The opposite is true outside of the window, all sync pulses are ignored and only an end-of-page will reset image memory.

Once the window operation is started by the occurrence of two consecutive valid sync pulses, all sync pulses occur within the window. If a sync pulse is missed, the print engine will sync to the end of the window. The imaging system will then properly adjust the following window such that the center of the window will be positioned where the sync pulse is expected, and will properly adjust the position of the secondary print engine to compensate for the repositioning of the primary engine.

If more than two consecutive syncs are missed, then the primary print engine will go into page roll-over mode. The primary print engine will stay in page roll-over mode until the phase-locked-loop reacquires lock on the sync pulse, after which normal phase-locked registration will resume. Therefore the sync pulse separation cannot change from sheet-to-sheet by more than ½ of the window size for more than 2 pages or erroneous registration will occur. Slave Sync Mode In the slave sync mode, it is not possible for contention to occur between the end-of-page signal and the sync pulse, because only the sync pulse is used for triggering the print engine. If the page length is shorter than the sync period or if a sync pulse is missed, then the print engine will continue to print the physical memory and will roll-over after 8192 lines have been printed. If the page length is longer than the sync period or if a double sync occurs, then the page will be truncated. Upon the occurrence of every sync pulse, the image memory will return to the top of the form and the memory planes will toggle if enabled by the SCU.

Registration Offset Adjustment

The imaging system allows for the adjustment of the image position for each print engine. The primary print engine offset adjusts the position of the primary and secondary images relative to the external sync source. If the primary print engine is in page roll-over mode, then the primary offset adjustment is not used. The secondary print engine offset adjusts the position of the secondary image relative to the primary image. This offset is always used on the secondary print engine regardless of the mode of the primary.

The range of offset adjustment for either print engine is +/−0.75 of the sync pulse separation for NORMAL mode. When the primary print engine is in page roll-over mode, then the offset adjustment range for the secondary is +/−0.75 of the primary page size. The offset adjustment resolution is ¼ of a pixel. Registration adjustments are implemented in two ways known as make-ready and running. When in make-ready, the offset adjustment can be changed by any amount in a single page. If the offset adjustment is more than ½ the window size, registration and paging errors will occur. When running a job, only offset adjustments of no greater than ½ the window size are allowed, thereby preventing paging errors. The registration offset values are set by loading register values into the SCU via the user interface.

Host Interface

Communication between the host processor and the imaging system is implemented using a job data channel for the sending of job-related data from the host to the imaging system, and a supervisor channel for passing commands and status messages from the imaging system to the host.

Job Data Channel

The job data channel provides the link from the host to the SCU and the RIPs for the job-related data. Data sent across the link is comprised of the job header data, sent to the SCU for resource loading and control, and the variable data sent to the RIPs for variable window data output.

Data will be sent from the host computer to the imaging across a unidirectional 16-bit parallel port. Two handshake lines will accompany the port. The handshake lines are comprised of Ready to Receive (from imaging system to host) and Data Valid (from host to imaging system). RS-422 compatible (differential) drivers and receivers are used, requiring 36 lines; 32 for data, 4 for handshaking.

Figure 13:
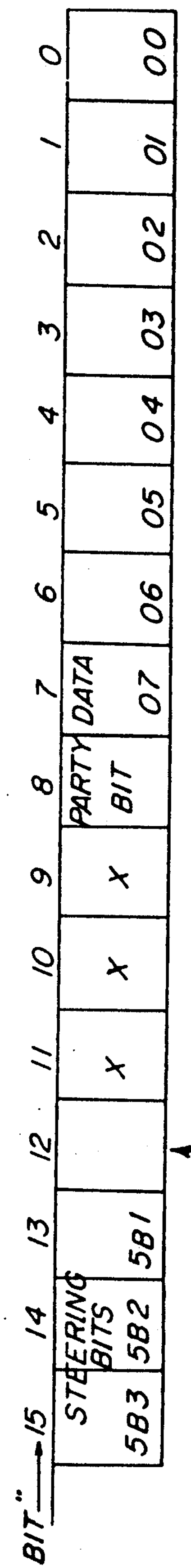
FIG. 13 is a view showing a typical forms printing job, namely a numbered bank check, which can be produced expeditiously by the press of this invention.

Programming codes are sent through the parallel interface a word at a time. The high byte of the word is control information, and the low-byte of the word is the data. The format of the word is shown in FIG. 13 and is described as follows.

Bits

15–13 Steering bits—Determines the destination of the host data. Data is "steered" directly to the appropriate hardware based on these bits.

Destinations are as follows:

| b15 | b14 | b13 | destination |
|---|---|---|---|
| 0 | 0 | 1 | SCU |
| 0 | 1 | 0 | RIP #1 - PE1 |
| 0 | 1 | 1 | RIP #3 - PE2 |
| 1 | 0 | 0 | RIP #2 - PE1 |
| 1 | 0 | 1 | RIP #4 - PE2 |

Command Code Indicator - Indicates the beginning of an SCU command sequence.

| | |
|---|---|
| 11-9 | Unused |
| 8 | Parity bit. |
| 7-0 | Data. |

SCU Programming Codes

All SCU codes have a high byte with a value hex 30 (steering to SCU, command code indicator set). Data values are loaded from the most significant byte to least significant; all code values are in hex; length values are in decimal; all strings must be null terminated. Code sequences are listed with the control byte, then the data byte, then any optional value ranges.

[**—Indicates the command is required]

1. Start of Job—80**.

This indicates that a new job follows.

| | | |
|---|---|---|
| Code sequence: | 30 | 80 |

2. Job Title—81.

This is a null-terminated ASCII string, maximum length is 20 characters.

| | | |
|---|---|---|
| Code sequence: | 30 | 81 |
| | 20 | ASCII |
| | 20 | ASCII |
| | 20 | 00 |

3. Comment—82.

This is jot, identifying information useful to the operator. It is a null-terminated ASCII string; maximum length is 70 characters.

| | | |
|---|---|---|
| Code sequence: | 30 | 82 |
| | 20 | ASCII |
| | 20 | ASCII |
| | [as needed. . . ] | |
| | 20 | 00 |

4. Page Length—83**.

This defines the length of the page in pixels (word). There may be multiple pages per knife sync distance, so page length is never greater than knife sync distance.

| | | |
|---|---|---|
| Code sequence: | 30 | 83 |
| | 20 | bits 15-8 value: 1-8192 |
| | 20 | bits 7-0 |

5. Knife Sync Implementation—84**.

This code indicates the type of sync pulse, if any, to be used for the job. The indicator, a byte, has a value of 0 to indicate no sync, a value of 1 to indicate that the internal sync is to be used, and a value of 2 to indicate that an external sync is to be used.

| | | |
|---|---|---|
| Code sequence: | 30 | 84 |
| | 20 | 8-bit No. value: 0-2 |

6. Knife Sync Distance—85.

This instruction is needed if the sync pulse is implemented. It defines the distance between knife syncs in pixels.

| | | |
|---|---|---|
| Code sequence: | 30 | 85 |
| | 20 | bits 15-8 |
| | 20 | bits 7-0 |

7. Base Form—86.

This code is required for jobs using base forms. It tells the imaging system the name of the base form to be used (null-terminated ASCII string), the print engine the baseform is to be printed on (byte), and the x and y offset of the form (words).

| | | |
|---|---|---|
| Code sequence: | 30 | 86 |
| base form id: | 20 | ASCII |
| | 20 | ASCII |
| | | [as needed. . . ] |
| | 20 | 00 |
| print engine: | 20 | 8-bit No. value: 1-2 |
| x-offset: | 20 | bits 15-8 |
| | 20 | bits 7-0 |
| y-offset: | 20 | bits 15-8 |
| | 20 | bits 7-0 |

8. Window Descriptor—87.

This code is required for jobs with variable information. It defines window dimensions and associates them with a window identification. The window dimension must not exceed an area of 16 million pixels. There may be up to 256 windows per print engine, for a total of 512 windows. Window IDs must be unique across print engines. A window descriptor is composed of a window number (word), the print engine the window is associated with (byte), the x and y offset of the window (words), and the width and height of the window (words). The x offset and the width of the window is in units of 16 pixel words, while the y offset and the height is in pixel units.

| | | |
|---|---|---|
| Code sequence: | 30 | 87 |
| window #: | 20 | bits 15-8 value: 0-511 |
| | 20 | bits 7-0 |
| print engine: | 20 | 8-bit No. value: 1-2 |
| x-offset: | 20 | bits 15-8 |
| | 20 | bits 7-0 |
| y-offset: | 20 | bits 15-8 |
| | 20 | bits 7-0 |
| width: | 20 | bits 15-8 v value: 1-375 |
| | 20 | bits 7-0 |
| height: | 20 | bits 15-8 value: 1-8192 |
| | 20 | bits 7-0 |

9. Font Descriptor—88**.

This code indicates a font that needs to be loaded for the job. There should be as many of these commands as there are fonts required by the job that aren't currently in the RIP. A font descriptor includes the font name (null-terminated ASCII string), and the RIP it is to be loaded into (byte).

| | | |
|---|---|---|
| Code sequence: | 30 | 88 |
| font name: | 20 | ASCII |
| | 20 | ASCII |
| | . . . | . . . |
| | 20 | 00 |
| RIP ID: | 20 | 8-bit No. value: 1-2 |

10. Imager No. 1 Color—89**.

This instruction code describes the job's color requirement for imaging array for PE1. A value of 0 indicates the imager is not to be used. Imager color is a byte value.

| | | |
|---|---|---|
| Code sequence: | 30 | 89 |
| | 20 | 8-bit No. |

11. Imager No. 2 Color**—8A.

This code describes the job's color requirement for imaging array for PE2. A value of 0 indicates the imager is not to be used. Imager color is a byte value.

| | | |
|---|---|---|
| Code sequence: | 30 | 89 |
| | 20 | 8-bit No. |

12. Paper Code—8B.

This code identifies paper required by the job (null-terminated ASCII string).

| | | |
|---|---|---|
| Code sequence: | 30 | 8B |
| | 20 | ASCII |
| | 20 | ASCII |
| | [as needed. . . ] | |
| | 20 | 00 |

13. Paper Type—8C.

This code describes the type of paper required. Null-terminated ASCII string, maximum length: 70 characters.

| | | |
|---|---|---|
| Code sequence: | 30 | 8C |
| | 20 | ASCII |
| | 20 | ASCII |
| | [as needed. . . ] | |
| | 20 | 00 |

14. Total Pages—8D

This code defines the total number of pages the job is expected to use (long word).

| | | |
|---|---|---|
| Code sequence: | 30 | 8D |
| | 20 | bits 31-24 |
| | 20 | bits 23-16 |
| | 20 | bits 15-8 |
| | 20 | bits 7-0 |

15. End of Header—9F

This code indicates that the header data has been sent and variable data follows.

| | | |
|---|---|---|
| Code sequence: | 30 | 9F |

16. Start of Window Data—AO

This code loads the actual variable data for a window. Window data is composed of the window number (word), followed by the data. The data may be steered to either print engine, depending on the window, and is terminated with a form feed. A high-byte value of hex 40 steers the data to the print engine PE11 RIP #1, and a high-byte value of hex 60 steers the data to the print engine PE2 RIP #3 (60 may be substituted for 40 in the high-byte code sequence below). The window data steered to the RIPs may contain a combination of window text data and RIP programming codes (see section 3.2.5). All window data is terminated with a form feed so that RIP knows when to begin composing the data to bit-nap form.

| | | |
|---|---|---|
| Code sequence: | 30 | AO |
| window No: | 20 | bits 15-8 value: 0-511 |
| | 20 | bits 7-0 |
| data: | 40 | ASCII window data and RIP codes. |
| | 40 | ASCII data and RIP codes. |
| | . . . | . . . |

17. End of Page**—Al.

This code indicates that the entire page has been sent and requests the number of copies to be printed (long word).

| | | |
|---|---|---|
| Code sequence: | 30 | Al |
| No. of copies: | 20 | bits 31-24 |
| | 20 | bits 23-16 |
| | 20 | bits 15-7 |
| | 20 | bits 7-0 |

18. End of Job**—FF.

| | | |
|---|---|---|
| Code sequence: | 30 | FF |

RIP Programming Codes

All RIP programming codes must have a high-byte value of hex 40 for the print engine PE1 RIP, or hex 60 for the print engine PE2 RIP. Only the least significant byte of the programming-code word will be sent to the RIPS. The data sent to the RIPs will typically be a mix of RIP programming codes and ASCII text window data. Examples of the RIP programming codes sent from the host are shown below.

```
Text Mode commands
1. Select Font - ESC [ font m
                1B   5B   6D
   font - 1 to 65535 (must be previously loaded with the
font descriptor command in section 3.2.4)
2. Delete All Fonts - ESC [ # v
                1B   5B2376
3. Delete One Font - ESC [ font # w
                1B   5B   2377
   font - 1 to 65535
4. Select Top Margin - ESC [ margin r
                1B   5B    72
5. Select Left Margin - ESC [ margin s
                1B   5B    73
6. Select FOB Load - ESC [ 1 " s
                1B   5B312273
7. Select FOB for Print - ESC [ 1 " p
                1B   5B312270
8. Deselect FOB - ESC [ " p
                1B   5B2270
9. Enter Position Mode, Current Orientation - ESC [ 1 $ q
                                  1B   5B312471
10. Enter Position Mode, Rotation 0 - ESC [ 2 $ q
                             1B   5B322471
11. Enter Position Mode, Rotation 3 - ESC [ 3 $ q
                             1B   5B332471
FOB Mode commands
(Used for shading & vector)
1. Reset FOB - ESC c
            1B   63
2. Select Write Mode - ESC [ mode " (
                        1B   5B   227B
   mode - 0 to 2
3. Download shade pattern - ESC [ shade ; 1 # p
                               1B   5B   3B312370
   shade - 33 to 40
4. Shade Defined Area ESC [ width ; height ; shade " q
                      1B  5B      3B       3B    2271
   shade - 0 to 40
5. Define window for raster data - ESC [ width ; height " w
6. Load raster data - ESC [ bytes " r
                      1B  5B      2272
```

-continued

```
    bytes - 1 to 65535
 7. Horiz./Vert. Line - ESC [ orientation ; x-dist ; y-dist
                         1B  5B           3B        3B
                         ; length; thickness !
                        3B        3B       217C
    orientation - 0 to 1
 8. Draw Vector - ESC [ start-x ; start-y ; end-x ; end-y ;
                  1B  5B        3B        3B      3B     3B
                  thickness " t
                            2274
 9. Draw Vector, Relative - ESC [ end =x ; end-y ; thickness
                            1B  5B     3B      3B
                            " u
                            2275
10. Horizontal Position Absolute - ESC [ x-pos '
                                   1B  5B   60
11. Horizontal Position Relative - ESC [ delta-x a
                         1B  5B    61
12. Vertical Position Absolute - ESC [ y-pos d
                         1B  5B    64
13. Vertical Position Relative - ESC [ delta-y e
                         1B  5B    65
14. Horizontal, Vertical Position Absolute -
      ESC [ x-pos ; y-pos f
      1B  5B      3B      66
15. Define Offset - ESC [ x-offs ; y-offs ; negative ;
              1B  5B     3B       3B         3B
                  negative " y
                           2279
16. Terminate FOB Load - ESC [ " s
                         1B  5B2273
```

Page Mode commands

```
1. Horizontal Position Absolute - same as FOB Mode
2. Vertical Position Absolute - same as FOB mode
3. Exit Position Mode - ESC [ $ q
                        1B  5B2471
```

The following are RIP commands used by the imaging system, but not used by the host for level 1.

```
1. Select Pixel Units** - ESC [ 7 space I
                          1B  5B3720    49
2. Start Font Load** - ESC [ font ; 1 # s
                       1B  5B      3B312373
   font - 1 to 65535
3. Continue Font Load** - ESC [ byt#s # r
                          1B  5B      2372
   bytes - 0 to 128
4. Stop Font Load** - ESC [ ; # s
                      1B  5B3B2373
5. Window Size** - ESC [ width ; height # t
                   1B  5B      3B       2374
   width * height must be less than 16 megapixels
```

Supervisor Channel

The supervisor channel provides the link from the SCU to the host for the relaying of job control command information as well as job and press status information. Hardware The supervisor channel is comprised of an RS-232 compatible serial line.

| RS - 232 Parameters |
|---|
| Baud rate: 9600 |
| Parity: none |
| Data bits: 8 |
| Stop bits: 1 |

Protocol

The command/status codes sent from the imaging system to the host will be in the format: <ESC>;code parm1 parm2 . . . <LF>.

Escape (hex 1B), semi-colon, and the command/status code begin the sequence, with any parameters associated with the code following, separated by spaces. All code sequences are terminated with a line feed (hex OA). All numerical parameter values are represented in ASCII. For example, the number 32 would come across the serial line as hex 30 and hex 32, in that order. Leading zeros may also be included. DEI8 Command/Status Codes The value of the command/status code, in hex, is indicated after the command name.

1. Cancel Job—41.

Description: The host is to terminate the sending of data for the current job, and should begin sending job header information for the next job, if any jobs remain.

Parameters: None.

Code sequence: <ESC>;A<LF>

2. Restart Job—42.

Description: The host is to resend the current job from the beginning, including the Start of Job command and the job header data.

Parameters: None.

Code sequence: <ESC>;B<LF>

3. Backup Job—43.

Description: The host is to "backup" and repeat the sending of a desired number of pages.

Parameters: Pl: The number of pages to backup, references to the current page.

Code sequence: <ESC>;C Pl<LF>

Job Example

Following is a possible implementation for the header data of the accounts-payable check example

| | |
|---|---|
| Job Title | ABC Co. |
| Comment | Accounts Payable checks |
| Page Length | 1000 pixels |
| Knife Sync | external |
| Knife Sync distance | 1100 pixels |
| Base form | ABC.rle |
| print engine: | 1 |
| x-offset: | 0 pixels |
| y-offset: | 0 pixels |
| Window #0 (check date) | |
| print engine: | 1 |
| x-offset: | 80 (× 16 pixels) |
| y-offset: | 200 pixels |
| width: | 18 (× 16 pixels) |
| height: | 100 pixels |
| Window #1 (check number) | |
| print engine: | 1 |
| x-offset | 100 (× 16 pixels) |
| y-offset | 200 pixels |
| width: | 18 (× 16 pixels) |
| height: | 100 pixels |
| Window #2 (check amount) | |
| print engine: | 1 |
| x-offset: | 84 (× 16 pixels) |
| y-offset: | 500 pixels |
| width: | 34 (× 16 pixels) |
| height: | 100 pixels |
| Window #3 (recipient's name and address) | |
| print engine: | 1 |
| x-offset: | 30 (× 16 pixels) |
| y-offset | 650 pixels |
| width: | 34 (× 16 pixels) |
| height: | 200 pixels |
| Fonts Used | |
| Windows 0, 1, & 2: | 12.dlf |
| Window 3: | 14.dlf |

Header data

| | | | | | | | | |
|---|---|---|---|---|---|---|---|---|
| Start of Job | 3080 | | | | | | | |
| Job Title | 3081 | 2041 | 2042 | 2043 | 2020 | 2042 | 2068 | 2000 |
| | | A | B | C | | C | o | |
| Comment | 3082 | 2041 | 2063 | 2063 | 2068 | 2075 | 2067 | 2074 |
| | | A | c | c | o | u | n | t |

-continued

| | | | | | | | | | |
|---|---|---|---|---|---|---|---|---|---|
| | 2073 | 2020 | 2050 | 2061 | 2079 | 2061 | 2062 | 206C | |
| | s | | P | a | y | a | b | l | |
| | 2065 | 2020 | 2043 | 2068 | 2065 | 2063 | 206b | 2073 | |
| | e | | C | h | e | c | k | s | |
| | 2000 | | | | | | | | |
| Page Length | 3083 | 2003 | 20E8 | | | | | | |
| Knife Sync Implementation | 3084 | 2002 | | | | | | | |
| Knife Sync Distance | 3085 | 2004 | 204C | | | | | | |
| Base Form | 3086 | 2048 | 2061 | 2072 | 2072 | 2069 | 2073 | 202E | |
| | | H | a | r | r | i | s | | |
| | 2072 | 206C | 2065 | 2000 | 2001 | 2000 | 2000 | 2000 | |
| | r l | e | | | | | | | |
| | 2000 | | | | | | | | |
| Window #0 | 3087 | 2000 | 2000 | 2001 | 2000 | 2050 | 2000 | 20C8 | |
| | 2000 | 2012 | 2000 | 2064 | | | | | |
| Window #1 | 3087 | 2000 | 2001 | 2001 | 2000 | 2064 | 2000 | 20C8 | |
| | 2000 | 2012 | 2000 | 2064 | | | | | |
| Window #2 | 3087 | 2000 | 2002 | 2001 | 2000 | 2054 | 2001 | 20F4 | |
| | 2000 | 2022 | 2000 | 2064 | | | | | |
| Window #3 | 3087 | 2000 | 2003 | 2001 | 2000 | 201E | 2002 | 208A | |
| | 2000 | 2022 | 2000 | 20C8 | | | | | |
| Load Font | 3088 | 2031 | 2032 | 202E | 2064 | 206C | 2066 | 2000 | |
| | | 1 | 2 | . | d | l | f | | |
| | 2001 | | | | | | | | |
| Load Font | 3088 | 2031 | 2034 | 202E | 2064 | 206C | 2066 | 2000 | |
| | | 1 | 4 | . | d | a | f | | |
| | 2001 | | | | | | | | |
| End of header | 309F | | | | | | | | |
| Variable data | | | | | | | | | |
| Window 0 | 30A0 | 2000 | 2000 | 401B | 405B | 4031 | 4032 | 406D | 4034 |
| | | | | ESC | [ | 1 | 2 | m | 4 |
| | 402D | 4032 | 4034 | 402D | 4038 | 4038 | 400C | | |
| | 2 | 4 8 | 8 | | | | | | |
| Window 1 | 30A0 | 2000 | 2001 | 4034 | 4031 | 4030 | 4030 | 4030 | 4031 |
| | | | | | 4 | 1 | 0 | 0 | 0 1 |
| | 400C | | | | | | | | |
| Window 2 | 30A0 | 2000 | 2002 | 4024 | 4035 | 402C | 4030 | 4030 | 4030 |
| | | | | | $ | 5 | , | 0 | 0 0 |
| | 402E | 4030 | 4030 | 400C | | | | | |
| | . | 0 | 0 | | | | | | |
| Window 3 | 30A0 | 2000 | 2003 | 401B | 405B | 4031 | 4034 | 406D | 4050 |
| | | | | ESC | [ | 1 | 4 | m | P |
| | 4065 | 406E | 407A | 4061 | 4020 | 4043 | 406F | 4072 | 4070 |
| | e | n | z | a | | C | o | r | p |
| | 400D | 400A | 4035 | 4039 | 4031 | 4020 | 4043 | 4061 | 406C |
| | | | 5 | 9 | 1 | | C | a | l |
| | 4069 | 4066 | 406F | 4072 | 406E | 4069 | 4061 | 4020 | 4050 |
| | i | f | o | r | n | i | a | | P |
| | 406C | 402E | 400D | 400A | 4044 | 4061 | 4079 | 4074 | 406F |
| | l | . | | | D | a | y | t | o |
| | 406E | 402C | 4020 | 404F | 4048 | 4020 | 4020 | 4034 | 4035 |
| | n | | | 0 | H | | | 4 | 5 |
| | 4034 | 4031 | 4034 | 400C | | | | | |
| | 4 | 1 | 4 | | | | | | |
| End Page | 30A1 | 2000 | 2000 | 2000 | 2001 | | | | |

Repeat above variable data commands for any windows which change, until all pages of the job have been printed.

End Job 30FF

Summary

From the foregoing description and examples, it will be apparent that the present invention provides methods and apparatus which achieve highly flexible digital printing, on a variety of web materials, with minimum makeready, and with perfecting capability and multicolor capability. This includes the ability to change jobs without press stoppage, and to incorporate variable information (from image to image) in jobs which require such variable data, such as consecutively numbered checks or similar documents. The use of digital electrographic printing with a special liquid developer, the ability constantly to refresh the developer for consistent toner presentation to the electrostatic latent images, and the ability to adjust circumferential and lateral registration of images on the print material (web), especially where more than one printing engine is provided, achieve a significant advance in the art of web printing, and especially in printing of business forms, direct mail advertising, manuals and other printing jobs as previously mentioned.

While the apparatus and methods herein described constitute preferred embodiments of this invention, it is to be understood that the invention is not limited to these precise methods and forms of apparatus, and that changes may be made in either without departing from the scope of the invention, which is defined in the appended claims.

What is claimed is:

1. In an electrostatic printing press for printing a succession of images on print receiving material including supply means and delivery means supported in spaced relation and means for driving and guiding print receiving material therebetween along a predetermined printing path, said means for driving the print receiving material including a programmable speed controller, a cylinder having a photoreceptor surface and means supporting said cylinder along the printing path in a position to con&act said material, means for rotating said cylinder such that said surface has a peripheral velocity and direction corresponding to movement of the material, charging means for creating a uniform electrostatic charge on said surface at a first high potential, a digital exposure means extending transversely of said surface for directing radiant energy onto predetermined non-image pixel areas on the charged cylinder surface to cause selective dissipation of the charge on such discrete areas to a second low potential, thereby to form an electrostatic latent image on said surface, developing means for applying a developer to the latent image, said developer including toner particles having a negative charge, said developing means including a shoe member contoured to said surface of said cylinder for containing the developer in contact with a predetermined area of said cylinder carrying the electrostatic latent image and a development electrode means for contacting developer in said shoe member, means for applying to said development electrode means a third potential intermediate the first and second potentials whereby the toner particles are attracted to the image areas on said cylinder surface and repelled from the non-image areas of said cylinder surface, said speed controller including voltage level adjustment means for adjusting said second and third potential in direct relation to press operating speed.

2. A press as defined in claim 1, wherein said voltage level adjustment means also adjusting the potential applied to said charging means in direct relation to press operating speed.

3. A press as defined in claim 1, wherein said developer is a liquid including toner particles and a carrier liquid, means for recirculating said liquid developer through said shoe member, means guiding the print receiving material into contact with said cylinder surface at a transfer region past said developing means, means for applying a substantial transferring potential to said print receiving material to attract the toner particles forming the developed image onto the print receiving material, and said voltage level adjustment means also acting to adjust the transferring potential applied to the print receiving material in direct relation to press operating speed.

4. A press as defined in claim 3, including a power driven metering roll interacting with said cylinder surface between said developing means and the transfer region to reduce the amount of carrier liquid carried on said surface to the print receiving material, means for applying a bias potential to said metering roll, and said voltage level adjustment means also acting to adjust the potential applied to said metering roll in direct relation press speed.

5. An electrostatic printing press as defined in claim 3, including fusing means for directing streams of heated air onto the surfaces of the print receiving material to fuse transferred toner particles to the material and for vaporizing the carrier liquid transferred to the material, means for collecting the vaporized carrier liquid, and means for oxidizing the vaporized carrier liquid.

6. A press as defined in claim 5, including a cooled chill roll contacting said print receiving material coming from said fusing means and on the side of the material opposite the developed image.

7. A press as defined in claim 6, including means guiding the print receiving material around a major portion of the circumference of said chill roll, and said chill roll being connected to said driving means to draw the material from the fusing means and maintain tension in the print receiving material.

8. A press as defined in claim 1, wherein said exposure means includes an array of closely spaced individual light beam generators and driving circuits for said light beam generators to switch each generator on and off, said driving circuits including individual control circuits for selectively operating said driving circuits according to digital imaging data, and means for supplying imaging data to said driving circuits at a rate sufficient to refresh the data for each driving circuit at a rate greater than the number of pixel areas circumferentially of said surface.

9. A press as defined in claim 8, including means for generating latch pulses corresponding to the peripheral velocity of said cylinder and at a rate to divide said surface into pixel areas at least equal to the spacing of light beam generators whereby resolution around said cylinder at least equals resolution of said exposure means across said cylinder, and means for supplying imaging data to all said driving circuits at a rate greater than the latch pulse rate.

10. A press as defined in claim 8, including an encoder driven by said driving means in synchronism with said cylinder and generating a string of latch pulses per each cylinder revolution to identify pixel areas around said surface.

11. A press as defined in claim 1, wherein said delivery means includes a sheeter mechanism for separating the web into individual sheets of uniform size.

12. A press as defined in claim 1, further including a processing section having at least a cross perforation unit for forming transverse perforations in the web at regularly spaced intervals.

13. A press as defined in claim 12, including a sensor cooperating with said cross perforator to generate registration pulses each time the perforator forms a cross perforation, and means for applying the registration pulses to said exposure means to control the registration of images with respect to the space on the web between successive cross perforations.

14. A press as defined in claim 13, wherein said delivery means includes a zig-zag folder mechanism for folding the web about the cross perforations.

15. In a digital electrostatic printing press for printing a succession of images on print receiving material including supply means and delivery means supported in spaced relation and means for driving and guiding print receiving material therebetween along a predetermined processing path, a cylinder having a photosensitive surface and means supporting said cylinder along the processing path in a position to contact said material, means for rotating said cylinder such that said surface has a peripheral velocity and direction corresponding to movement of the material, charging means for creating a uniform electrostatic charge on said cylinder surface at a potential of at least 1000 Volts, exposure means extending transversely of said surface for directing a plurality of small parallel beams of radiant energy onto adjacent discrete areas of about 0.003 inch across said cylinder surface to cause selective dissipation of the charge on such discrete areas in the order of 100 to 300 Volts, thereby to form an electrostatic latent image as successive linear dot patterns transversely of said surface, said exposure means being located around said drum from said charging means such that the uniformly charged part of said surface is presented to said exposure means, developing means for applying a liquid developer to said cylinder surface to develop the electrostatic latent image, said developer including toner particles having a size in the range of i to 10 microns and a negative charge in the range of 60 to 75 picamhos/cm dispersed in a volatile carrier liquid, said developing means including a shoe member contoured to said surface of said cylinder and containing the liquid developer in contact with a predetermined area of said cylinder carrying the electrostatic latent image, said shoe member including development electrode means arranged for contact with developer in said shoe member, means for applying to said development electrode means a potential in the order of 200 to 600 Volts whereby the toner particles in the liquid developer are attracted to the image areas on said cylinder surface and repelled from the non-image areas of said cylinder surface, means guiding said print receiving material into contact with said cylinder surface at a region past said developing means in the direction of rotation of said cylinder, means for transferring the toner particles from the latent image onto the material, and means for fixing the toner particles to the print receiving material whereby the material can be printed with variable information and processed accordingly in a single press without need for printing makeready operations.

16. An electrostatic printing press as defined in claim 15, including cleaning means located beyond said means for transferring and ahead of said charging means in the direction of movement of said cylinder and operating to remove from said cylinder surface all toner particles not transferred to the print receiving material.

17. An electrostatic printing press as defines in claim 15, including means for circulating liquid toner which is a mixture of toner particles and carrier liquid through said shoe member to maintain a concentration of toner particles in said shoe member sufficient to develop all image areas of the electrostatic latent image.

18. An electrostatic printing press as defined in claim 15, including means for directing streams of heated air onto the surfaces of the print receiving material to fuse transferred toner particles to the material and for vaporizing the carrier liquid transferred to the material, means for collecting the vaporized carrier liquid, and means for oxidizing the vaporized carrier liquid.

19. An electrostatic printing press as defined in claim 15, wherein said print receiving material is a continuous web and means for driving and guiding the web material along the processing path, and a web infeed control for maintaining controlled tension in the web material.

20. A web printing press as defined in claim 19, including web supply means including a web infeed control for supplying various types of web material under controlled tension, processing means for performing at least one conversion operation on a web, such as perforating or punching, means for guiding and moving a web along a processing path from said supply means to said delivery means through said processing means, delivery means for gathering the printed and processed web.

21. An electrostatic printing press for printing a succession of images on print receiving material, comprising supply means and delivery means supported in spaced relation and means for driving and guiding print receiving material therebetween along a predetermined path, a cylinder having a photosensitive surface and means supporting said cylinder along the path in a position to contact said material, means for rotating said cylinder such that said surface has a peripheral velocity and direction corresponding to movement of the material, charging means for creating a uniform electrostatic charge on said cylinder surface at a first high potential, exposure means extending transversely of said surface for directing radiant energy onto predetermined discrete non-image areas on said cylinder surface to cause selective dissipation of the charge on such discrete areas to a second low potential, thereby to form an electrostatic latent image on said surface, said exposure means being located around said drum from said charging means such that the uniformly charged part of said surface is presented to said exposure means, developing means for applying a liquid developer to said cylinder surface, said developer including toner particles having a negative charge and being dispersed in a volatile carrier liquid, said developing means including a shoe member contoured to said surface of said cylinder for containing the liquid developer in contact with a predetermined area of said cylinder carrying the electrostatic latent image, said shoe member including development electrode means arranged for contact with developer in said shoe member, means for applying to said development electrode means a third potential intermediate the first and second potentials whereby the toner particles in the liquid developer are attracted to the image areas on said cylinder surface and repelled from the non-image areas of said cylinder surface;

the improvement comprising means for circulating the liquid developer through said shoe member to refresh developer depleted of toner particles and to flush concentration of toner particles away from said development electrode.

22. A printing press as defined in claim 21, wherein said exposure means for directing radiant energy onto said cylinder surface includes means for focusing the radiant energy into predetermined discrete non-image areas of about 0.003 inch to cause selective dissipation of the charge on such discrete areas to between approximately 100 and 300 Volts, thereby to form an electrostatic latent image as dot patterns on said surface, said liquid developer including toner particles having a size in the order of 0.003 inch and a negative charge in the range of 60 to 75 picamhos/cm dispersed in a volatile carrier liquid, and said third potential applied to said development electrode means being in the order of 200 to 600 Volts.

23. A web printing press as defined in claim 21, wherein said means for driving the print receiving material includes a programmable speed controller, means connecting said speed controller to said means for applying second and third voltages to vary those voltages directly with changes in press speed.

24. A web printing press for printing a succession of images on a web, comprising web supply means and delivery means supported in spaced relation and means for driving and guiding web material therebetween along a predetermined path, a cylinder having a photoreceptor surface and means supporting said cylinder along the processing path in a position to contact said web material, means for rotating said cylinder such that said surface has a peripheral velocity and direction corresponding to movement of the web material, charging means for creating a uniform electrostatic charge on said photoreceptor surface at a first high potential, exposure means extending transversely of said surface for directing discrete beams of radiant energy at a resolution in the order of at least 300 per inch selectively onto predetermined discrete non-image pixel areas on said surface to cause selective dissipation of the charge on such discrete areas to a second low potential, thereby to form an electrostatic latent image on said surface, said exposure means being located around said drum from said charging means so a uniformly charged said surface is presented to said exposure means, developing means for applying a liquid developer to said cylinder surface, said developer including toner particles having a negative charge and being dispersed in a volatile carrier liquid, said developing means including a shoe member contoured to said surface of said cylinder for containing the liquid developer in contact across the area of said surface carrying the electrostatic latent image, said shoe member including development electrode means arranged for contact with developer in said shoe member, means for applying to said development electrode means a third potential intermediate the first and second potentials whereby the toner particles in the liquid developer are attracted to the image areas on said photoreceptor surface and repelled from the non-image areas of said surface, means guiding said web into contact with said surface at a region past said developing means in the direction of rotation of said cylinder, means for transferring the toner particles from the latent image and at least part of the carrier liquid onto the web, fusing means for directing streams of air heated to above the vaporization temperature of the carrier liquid onto the surfaces of the moving web material to fuse transferred toner particles to the web material and to vaporize the carrier liquid on the web material, means for cooling the web exiting said fusing means, and delivery means for gathering the web with the printed images fused thereto.

25. A press as defined in claim 24, further comprising said exposure means including an array of closely spaced individual light beam generators and means for driving said light beam generators to switch each generator on and off at a rate greater than the velocity of the photoreceptor surface past said exposure means, said driving means including individual control circuits for selectively operating said driving means according to digital imaging data, and means for supplying imaging data to said driving means at a rate sufficient to refresh the data for each driving means at a rate greater than the number of pixel areas circumferentially of said surface.

26. An electrostatic printing press for printing a succession of images on print receiving material, comprising supply means and delivery means supported in spaced relation and means for driving and guiding print receiving material therebetween along a predetermined path, a cylinder having a photosensitive surface and means supporting said cylinder along the processing path in a position to contact said material, charging means for creating a uniform electrostatic charge on said cylinder surface at a first high potential, exposure means extending transversely of said surface for directing radiant energy onto predetermined discrete non-image areas of about 0.003 inch on said cylinder surface to cause selective dissipation of the charge on such discrete areas thereby to form an electrostatic latent image as dot patterns on said surface, said exposure means being located around said drum from said charging means such that the uniformly charged part of said surface is presented to said exposure means, developing means for applying a liquid developer to said cylinder surface, said developer including negatively charged toner particles having a size in the order of 0.003 inch dispersed in a volatile carrier liquid, said developing means including a shoe member contoured to said surface of said cylinder for containing the liquid developer in contact with a predetermined area of said cylinder carrying the electrostatic latent image, said shoe member including development electrode means arranged for contact with developer in said shoe member, means for applying to said development electrode means a potential in the order of 200 to 600 Volts whereby the toner particles in the liquid developer are attracted to the image areas on said cylinder surface and repelled from the non-image areas of said cylinder surface;

the improvement comprising said driving means including a line shaft coupled to said supply means, said delivery means, and said cylinder for rotating said cylinder such that said surface has a peripheral velocity and direction corresponding to movement of the material, means for generating latch pulses at a rate equal to the peripheral velocity of said cylinder in inches /second times 300 whereby resolution around said cylinder at least equals resolution of said exposure means across said cylinder, means for supplying imaging data to said exposure means under the control of said means for generating latch pulses.

27. A web printing press for printing a succession of images on a web, comprising web supply means and delivery means supported in spaced relation and means for driving and guiding web material therebetween along a predetermined path, a cylinder having a photoreceptor surface and means supporting said cylinder along the processing path in a position to contact said web material, means for rotating said cylinder such that said surface has a peripheral velocity and direction corresponding to movement of the web material, charging means for creating a uniform electrostatic charge on said photoreceptor surface at a first high potential, exposure means extending transversely of said surface for directing discrete beams of radiant energy at a resolution in the order of at least 300 per inch selectively onto predetermined discrete non-image pixel areas on said surface to cause selective dissipation of the charge on such discrete areas to a second low potential, thereby to form an electrostatic latent image on said surface, said exposure means being located around said drum from said charging means so a uniformly charged said surface is presented to said exposure means, developing means for applying a liquid developer to said cylinder surface, said developer including toner particles having a negative charge and being dispersed in a volatile carrier liquid, said developing means including a shoe member contoured to said surface of said cylinder for containing the liquid developer in contact across the area of said surface carrying the electrostatic latent image, said shoe member including development electrode means arranged for contact with developer in said shoe member, means for applying to said development electrode means a third potential intermediate the first and second potentials whereby the toner particles in the liquid developer are attracted to the image areas on said photoreceptor surface and repelled from the non-image areas of said surface, means guiding said web into contact with said surface at a region past said developing means in the direction of rotation of said cylinder, means for transferring the toner particles from the latent image and at least part of the carrier liquid onto the web, fusing means for directing streams of air heated to above the vaporization temperature of the carrier liquid onto the surfaces of the moving web material to fuse transferred toner particles to the web material and to vaporize the carrier liquid on the web material, means for cooling the web exiting said fusing means, and delivery means for gathering the web with the printed images fused thereto.

28. In an electrostatic web printing press for printing a succession of images on a web of print receiving material including supply means and delivery means supported in spaced relation, means for driving a web between said supply means and said delivery means along a predetermined printing path including an adjustable speed controller, a cylinder, having a photoreceptor surface, supported along the printing path in a position to contact said material, said driving means rotating said cylinder such that said surface has a peripheral velocity and direction corresponding to movement of the web, charging means for creating a uniform electrostatic charge on said surface at a first high voltage, a digital exposure means including an array of closely spaced LEDs extending transversely of said surface for directing separate beams of light onto predetermined non-image pixel areas on the charged cylinder surface to cause selective dissipation of the charge on such areas to a second low potential, thereby to form an electrostatic latent image on said surface;

driving circuits for said LEDs to switch each LED on and off at a rate greater than the velocity of the photoreceptor surface past said exposure means, said driving circuits including individual control circuits for selectively operating said driving circuits according to digital imaging data, developing means for applying a developer to the latent image, said developer including toner particles having a negative charge, said developing means including a shoe member contoured to said surface of said cylinder for containing the developer in contact with a predetermined area of said cylinder carrying the electrostatic latent image and providing a development electrode means for developer in said shoe member, means for applying to said development shoe a third potential intermediate the first and second potentials whereby the toner particles are attracted to the image areas on said cylinder surface and repelled from the non-image areas of said cylinder surface, said speed controller including voltage level adjustment means for increasing said first, second and third potentials, and for adjusting said driving circuits to increase the driving current to the LEDs with increase in press operating speed.

29. A press as defined in claim 28, wherein said developer is a liquid including toner particles dispersed in a carrier liquid, and means for recirculating said liquid developer through said shoe member.

30. A press as defined in claim 29, including means guiding the web into contact with said cylinder surface at a transfer region past said developing means, means for applying a substantial transferring potential to said web to attract the toner particles forming the developed image onto the web, and said voltage level adjustment means also acting to adjust the transferring potential applied to the web in direct relation to press operating speed.

31. A press as defined in claim 29, including a power driven metering roll interacting with said surface between said developing means and the transfer region to reduce the amount of liquid carried on said surface to the web, means for applying a bias potential to said metering roll, and said voltage level adjustment means also acting to adjust the potential applied to said metering roll in direct relation to press speed.

32. An electrostatic printing press as defined in claim 29, including fusing means for directing streams of heated air onto the surfaces of the web to fuse transferred toner particles to the web and for vaporizing the carrier liquid transferred to the web.

33. A press as defined in claim 29, including a cooled chill roll contacting said web coming from said fusing means and on the side of the web opposite the developed image.

34. A press as defined in claim 33, including means guiding the web around a major portion of the circumference of said chill roll, and said chill roll being connected to said driving means to draw the material from the fusing means and maintain tension in the web.

35. A press as defined in claim 28, including means for generating latch pulses corresponding to the peripheral velocity of said cylinder and at a rate at least equal to the number of pixel areas around said surface, and means for supplying refreshed imaging data to all said driving circuits between successive latch pulses.

36. A press as defined in claim 28, including an encoder driven by said driving means in synchronism with said cylinder and generating a string of latch pulses per each cylinder revolution, which string equals the number of pixel areas around said surface.

37. A press as defined in claim 36, including means for directing the latch pulses to said control circuits of said driving circuits, to coordinate the driving of the LEDs to the latch pulse rate.

38. A press as defined in claim 37, including means for generating a fixed number of timebase pulses between latch pulses, and means for actuating said driving circuits during certain of said timebase pulses centered about the mid-point between latch pulses, whereby the on-time of the LEDs is centered within the pixel areas.

39. In an electrostatic web printing press for printing a succession of images on a web of print receiving material including supply means and delivery means supported in spaced relation;

means for driving a web between said supply means and said delivery means along a predetermined printing path including an adjustable speed controller;

a plurality of electrostatic printing engines arranged along the path to print images successively on the web, each said printing engine having a) a cylinder, having a photoreceptor surface, supported along the printing path in a position to contact said material, b) charging means for creating a uniform electrostatic charge on said surface at a first high electrical potential, c) a digital exposure means including an array of closely spaced LEDs extending transversely of said surface for directing separate beams of light onto predetermined non-image pixel areas on the charged cylinder surface to cause selective dissipation of the charge on such areas to a second low potential, thereby to form an electrostatic latent image on said surface, d) driving circuits for said LEDs to switch each LED on and off at a rate greater than the velocity of the photoreceptor surface past said exposure means, said driving circuits including individual control circuits for selectively operating said driving circuits according to digital imaging data, e) developing means for applying a developer to the latent image, said developer including toner particles having a negative charge, said developing means including a shoe member contoured to said surface of said cylinder for containing the developer in contact with a predetermined area of said cylinder carrying the electrostatic latent image and providing a development electrode means for developer in said shoe member.

f) means for applying to said development shoe a third potential intermediate the first and second potentials whereby the toner particles are attracted to the image areas on said cylinder surface and repelled from the non-image areas of said cylinder surface, and g) means for transferring developed images from said surface to the web;

said driving means rotating said cylinders in synchronism and such that said surfaces have a peripheral velocity and direction corresponding to movement of the web, said speed controller including voltage level adjustment means for increasing said first, second and third potentials, and for adjusting said driving circuits to increase the driving current to the LEDs, with increase in press operating speed.

40. A press as defined in claim 39, wherein said developer is a liquid including toner particles dispersed in a carrier liquid, means for recirculating said liquid developer through said shoe member.

41. A press as defined in claim 40, including in each printing engine means guiding the web into contact with said cylinder surface at a transfer region past said developing means, means for applying a substantial transferring potential to said web to attract the toner particles forming the developed image onto the web, and said voltage level adjustment means also acting to adjust the transferring potential applied to the web in direct relation to press operating speed.

42. A press as defined in claim 40, including a power driven metering roll interacting with said surface between said developing means and the transfer region to reduce the amount of liquid carried on said surface to the web, means for applying a bias potential to said metering roll, and said voltage level adjustment means also acting to adjust the potential applied to said metering roll in direct relation to press speed.

43. An electrostatic printing press as defined in claim 40, including fusing means supported along said path downstream from said printing engines and operating to direct streams of heated air onto the surfaces of the web to fuse all transferred toner particles to the web and for vaporizing the carrier liquid transferred to the web.

44. A press as defined in claim 40, including a cooled chill roll contacting said web coming from said fusing means and on the side of the web opposite the developed image.

45. A press as defined in claim 44, including means guiding the web around a major portion of the circumference of said chill roll, and said chill roll being connected to said driving means to draw the material through said printing engines and said fusing means and maintain tension in the web.

46. A press as defined in claim 39, each said printing engine also including means for generating latch pulses corresponding to the peripheral velocity of said cylinder and at a rate equal to the number of pixels around said surface, and means for supplying refreshed imaging data to all said driving circuits between successive latch pulses.

47. A press as defined in claim 39, each said printing engine also including an encoder driven by said driving means in synchronism with said cylinder and generating a string of latch pulses per each cylinder revolution, which string equals the number of pixel areas around said surface, whereby each printing engine controls the timing of data output to its LED driving circuits.

48. In an electrostatic web printing press for printing a succession of images on a web of print receiving material including supply means and delivery means supported in spaced relation;

means for driving a web between said supply means and said delivery means along a predetermined printing path including an adjustable speed controller;

a plurality of electrostatic printing engines arranged along the path to print images successively on the web, each said printing engine having a) a cylinder, having a photoreceptor surface, supported along the printing path in a position to contact said material, b) charging means for creating a uniform electrostatic charge on said surface, c) a digital exposure means including an array of closely spaced LEDs extending transversely of said surface for directing separate beams of light onto predetermined pixel areas on the charged surface to cause selective dissipation of the charge on such areas, thereby to form an electrostatic latent image on said surface, d) driving circuits for said LEDs to switch each LED on and off at a rate greater than the velocity of the photoreceptor surface past said exposure means, said driving circuits including individual control circuits for selectively operating said driving circuits according to digital imaging data, e) developing means for applying a developer including toner particles to the latent image, said developing means including a shoe member contoured to said photoreceptor surface for containing the developer in contact with a predetermined area of said surface, f) means for applying an electrical potential to said development shoe effective to attract toner particles to the image areas on said surface and to repel toner particles from the non-image areas of said surface, and g) means for transferring developed images from said surface to the web;

said driving means rotating said cylinders in synchronism and such that said surfaces have a peripheral velocity and direction corresponding to movement of the web, fusing means supported along said path downstream from said printing engines and operating to fuse all transferred toner particles to the web.

49. A press as defined in claim 48, including a cooled chill roll contacting said web coming from said fusing means and on the side of the web opposite the developed image.

50. A press as defined in claim 49, including means guiding( the web around a major portion of the circumference of said chill roll, and said chill roll being connected to said driving means to draw the material through said printing engines and said fusing means and maintain tension in the web.

51. A press as defined in claim 48, including web turning means located along said path between said print engines and operative to reverse the web to present opposite sides thereof to said first and second printing engines.

52. In an electrostatic web printing press for printing a succession of images on a web of print receiving material including supply means and delivery means supported in spaced relation;

means for driving a web between said supply means and said delivery means along a predetermined printing path including an adjustable speed controller;

a plurality of electrostatic printing engines arranged along the path to print images successively on the web, each said printing engine having a) a cylinder, having a photoreceptor surface defining an image area, supported along the printing path in a position to contact said material, b) charging means for creating a uniform electrostatic charge on said surface, c) exposure means for directing separate beams of light onto predetermined pixel areas of the image area on the charged surface along bands extending transversely of said surface to cause selective dissipation of the charge on such areas in digital fashion, thereby to form an electrostatic latent image on said surface within the image area, d) driving circuit means for said exposure means to switch said exposure means at a rate greater than the velocity of the photoreceptor surface past said exposure means, said driving circuits including register circuits for selectively operating said driving circuit means according to digital imaging data for a line of pixel areas, e) developing means for applying a developer including toner particles to the latent image, f) means for transferring developed images from said surface to the web;

g) an encoder driven in synchronism with said cylinder and generating a string of latch pulses per each cylinder revolution identifying lines of pixel areas across said image area, said driving means rotating said cylinders in synchronism and such that said surfaces have a peripheral velocity and direction corresponding to movement of the web, fusing means supported along said path downstream from said printing engines and operating to fuse all transferred toner particles to the web, a plurality of data interface units, one for each printing engine, including memory means for holding digital image information, means for transferring image information from said data interface units to said register circuits of the corresponding printing engines on a line-by-line basis, and means for driving said exposure means of each printing engine at a rate dependent upon the output of the corresponding encoder.

53. A press as defined in claim 52, including said memory means being divided into a fixed image memory section and a variable image memory section, and said means for transferring image information combining the digital image information from each memory section into composite image data which is transferred into the register circuits.

54. In an electrostatic web printing press for printing a succession of images on a web of print receiving material including supply means and delivery means supported in spaced relation;

means for driving a web between said supply means and said delivery means along a predetermined printing path including an adjustable speed controller;

an electrostatic printing engine arranged along the path to print images successively on the web, said printing engine having a) a cylinder, having a photoreceptor surface defining an image area, supported along the printing path in a position to contact said material, b) charging means for creating a uniform electrostatic charge on said surface, c) exposure means for directing separate beams of light onto predetermined pixel areas of the image area on the charged surface along bands extending transversely of said surface to cause selective dissipation of the charge on such areas in digital fashion, thereby to form an electrostatic latent image on said surface within the image area, d) driving circuit means for said exposure means to switch said exposure means at a rate greater than the velocity of the photoreceptor surface past said exposure means, said driving circuits including register circuits for selectively operating said driving circuit means according to digital imaging data for a line of pixel areas, e) developing means for applying a developer including toner particles to the latent image, f) means for transferring developed images from said surface to the web;

g) an encoder driven in synchronism with said cylinder and generating a string of latch pulses per each cylinder revolution identifying lines of pixel areas across said image area, said driving means rotating said cylinder in synchronism and such that said surface has a peripheral velocity and direction corresponding to movement of the web, fusing means supported along said path downstream from said printing engine and operating to fuse all transferred toner particles to the web, a data interface unit including memory means for holding digital image information, means for transferring image information from said data interface unit to said register circuits on a line-by-line basis, and means for driving said exposure means at a rate dependent upon the output of the corresponding encoder.

55. A press as defined in claim 54, including said memory means being divided into a fixed image memory section and a variable image memory section, and said means for transferring image information combining the digital image information from each memory section into composite image data which is transferred into the register circuits.

56. In a web printing press for printing a succession of images on a web of print receiving material including supply means and delivery means supported in spaced relation;

means for driving a web between said supply means and said delivery means along a predetermined printing path including an adjustable speed controller;

a printing engine arranged along the path to print images successively on the web, said printing engine having a) a cylinder, having a receptor surface defining an image area, supported along the printing path in a position to contact said material, b) exposure means for modifying predetermined pixel areas of the image area bands extending transversely of said surface in digital fashion to form a latent image on said surface within the image area, c) driving circuit means for said exposure means to switch said exposure means at a rate greater than the velocity of the receptor surface past said exposure means, said driving circuits including register circuits for selectively operating said driving circuit means according to digital imaging data for a line of pixel areas, d) means for developing and transferring the images from said surface to the web;

e) an encoder driven in synchronism with said cylinder and generating a string of latch pulses per each cylinder revolution identifying lines of pixel areas across said image area, said driving means rotating said cylinder in synchronism and such that said surface has a peripheral velocity and direction corresponding to movement of the web, a data interface unit including memory means for holding digital image information, said memory means being divided into a fixed image memory section and a variable image memory section, means for combining the digital image information from each memory section into composite image data and transferring the composite image information from said data interface unit to said register circuits on a line-by-line basis.

57. The method of printing images on a moving web directly from digital image data, comprising the steps of a) providing a refreshable receptor area on a drum surface and guiding a web into position for transfer of images developed on the receptor area successively onto the web, b) transporting the web and rotating the drum in synchronism, c) storing digitized basic image data into a first memory, d) storing digitized variable image data into a second memory, e) reading the stored image data simultaneously and synchronously into registers, then during each drum revolution f) creating a developed image on the receptor area during each drum revolution using the combined image data in the registers, g) transferring the developed image to the web, h) preparing the receptor area for the creation of a new image.

58. The method of claim 57, wherein the receptor area is a photoreceptor surface, further comprising step (f) including the consecutive steps of f-1) electrostatically charging the photoreceptor, f-2) exposing a band of pixel areas across the surface to individual beams of light to discharge such pixel areas leaving a latent electrostatic image, f-3) applying developer to the latent image to create a developed image with toner particles from the developer;

step (h) including removal of all residual toner particles from the photoreceptor surface prior to repeating step (f-1).

59. The method of claim 58, wherein an array of closely packed LEDs is supported adjacent the photoreceptor surface and extending lengthwise of the drum so the surface continually passes the array, further comprising step (f-2) including driving selected ones of the LEDs in the array according to the image data supplied to the registers for consecutive lines of pixel areas to be exposed, generating latch pulses synchronized to the drum rotation and each identifying the beginning of a line of pixel areas, whereby latch pulse rate will vary with speed change of the drum and web, and applying the image data in the registers to LED drivers under control of the latch pulses, whereby LED driving is synchronized to drum and web speed.

60. A method for printing a succession of images on a web of print receiving material including a) driving a web between a web supply station and a web delivery station along a predetermined printing path at adjustable speeds;

b) providing a refreshable photoreceptor surface on a drum and guiding the web into position for transfer of images developed on the photoreceptor surface successively onto the web, and rotating the drum in synchronism with the web speed;

then during successive revolutions of the drum c) creating a uniform electrostatic charge on the surface;

d) exposing predetermined pixel areas of the charged surface to individual closely spaced light beams along bands extending transversely of such surface with an array of light beam generators, such as closely packed LEDs, to cause selective reduction of the surface charge at such pixel areas in digital fashion, thereby forming line-by-line an electrostatic latent image on the photoreceptor surface;

e) providing register circuits for holding digital imaging data for a line of pixel areas, f) generating a string of latch pulses per each drum revolution to identify the circumferential location of lines of pixel areas across the photoreceptor surface and selectively switching on/off the individual light beam generators of the array during step (d) at a rate dependent upon the drum velocity and according to data held in the register circuits, g) applying a developer including toner particles to latent image;

h) transferring developed images from the photoreceptor surface to the web;

i) fusing all transferred toner particles to the web; and j) cleaning the photoreceptor surface of all residual toner particles after step (h).

61. The method of claim 60, further comprising k) providing a data interface unit including a memory for holding digital information for a complete image, l) transferring image information from the data interface unit to the register circuits on a line-by-line basis and at a rate sufficient to refresh all register circuits between successive latch pulses.

62. The method of claim 60, wherein the data interface unit includes a first memory for basic image data and a second memory for variable image data, step (l) including reading image data simultaneously from both memories and merging the data into composite image data which is transferred to the register circuits.

63. The method of claim 62, further including m) after step (i) moving the web through a processing apparatus driver in synchronism with the web, n) producing a registration signal corresponding to the position of rotary element of the processing apparatus while such element is repeatedly working on the web; and o) using the registration signal to identify the initiation of latch pulses and thereby registering the edge of the repetitively produced images to the action of the processing element on the web.

64. The method of claim 63, wherein the processing element is a cross perforator which forms transverse perforations across the web at spaced intervals, and the registration signal corresponds to when the cross perforator is in contact with the web.

* * * * *

UNITED STATES PATENT AND TRADEMARK OFFICE
CERTIFICATE OF CORRECTION

PATENT NO. : 5,043,749

DATED : August 27, 1991

INVENTOR(S) : Dinesh G. Punater, et al.

It is certified that error appears in the above-identified patent and that said Letters Patent is hereby corrected as shown below:

Column 38, line 31, claim 1, delete "con&act" and insert --contact--.

Column 40, line 44, claim 15, after "areas" insert --to--.

Column 41, line 23, claim 17, change "defines" to --defined--.

Column 49, line 67, claim 50, delete "(".

Signed and Sealed this

Twenty-seventh Day of April, 1993

*Attest:*

MICHAEL K. KIRK

*Attesting Officer*

*Acting Commissioner of Patents and Trademarks*